United States Patent

[11] 3,633,336

[72] Inventor Dietrich G. Rempel
Akron, Ohio
[21] Appl. No. 14,591
[22] Filed Feb. 26, 1970
[45] Patented Jan. 11, 1972
[73] Assignee Rempel Enterprises, Inc.
Akron, Ohio

[54] FRUIT-PICKING APPARATUS
15 Claims, 26 Drawing Figs.

[52] U.S. Cl. ................................................. 53/391
[51] Int. Cl. ........................................... A01d 90/00
[50] Field of Search ............................................. 53/390,
391; 56/328 R; 182/129, 141; 214/83.1, 83.26, 83.3, 83.36

[56] References Cited
UNITED STATES PATENTS
3,523,404   8/1970   Girardi ........................... 53/391
3,077,720   2/1963   Grove et al. .................... 56/328 R
2,798,623   7/1957   Girardi ........................... 214/83.1

Primary Examiner—Theron E. Condon
Assistant Examiner—Robert L. Spruill
Attorney—Hamilton, Cook, Renner & Kenner

ABSTRACT: A fruit-picking apparatus comprising an articulated hollow boom having an extensible upper arm containing coextensible conveyor means for conveying fruit into the top of an upwardly inclined lower arm regardless of the inclination of said upper arm, the bottom of said lower arm being rotatably mounted on the vehicle over a throat into which the fruit is discharged. The upper arm has a circular picker-supporting bucket at its outer end with an outer annular fruit-receiving trough arranged to discharge fruit onto the conveyor means in the upper arm. The supporting vehicle has rearwardly extensible conveyor means conveying fruit rearwardly from the throat to a container supported on the vehicle in horizontal fruit-receiving position, and means are provided for depositing a filled container on the ground and supporting an empty container in fruit-receiving position forwardly of said deposited container, the operations of manipulating the picker bucket and the fruit collecting and depositing means being controlled at the picker-supporting bucket. The method of picking comprises fully picking the entire spherical halves of opposed pairs of trees in adjacent rows, all the picking being done from the outer end of the articulated extensible boom rotatably mounted on the vehicle when at a central location radially of the four trees, conveying fruit from all parts of the tree halves through the boom to the forward part of the vehicle, conveying fruit rearwardly of the vehicle to a collecting basket, and successively depositing filled baskets on the ground in a line between the tree rows while the vehicle is at said central location, so as to be in position to be picked up by a collection vehicle passing linearly between the tree rows.

INVENTOR
DIETRICH G. REMPEL
BY Hamilton, Cook,
Renner & Kenner
ATTORNEYS

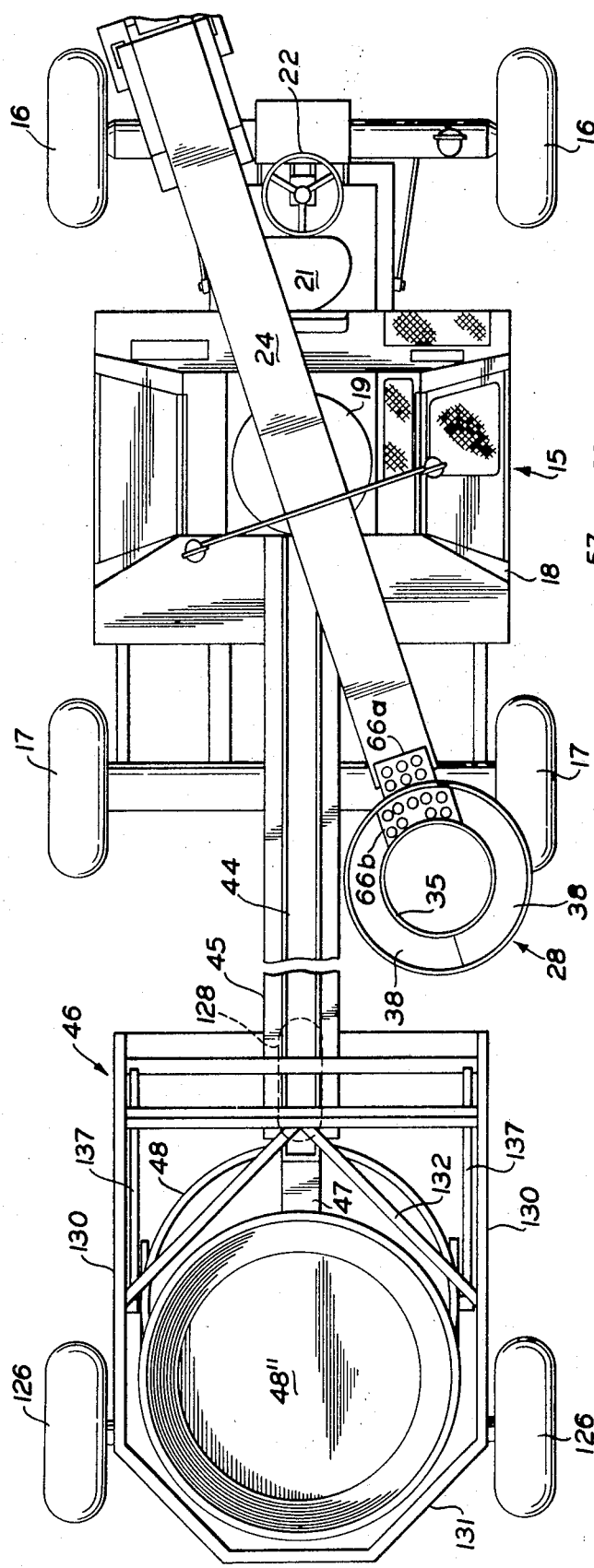

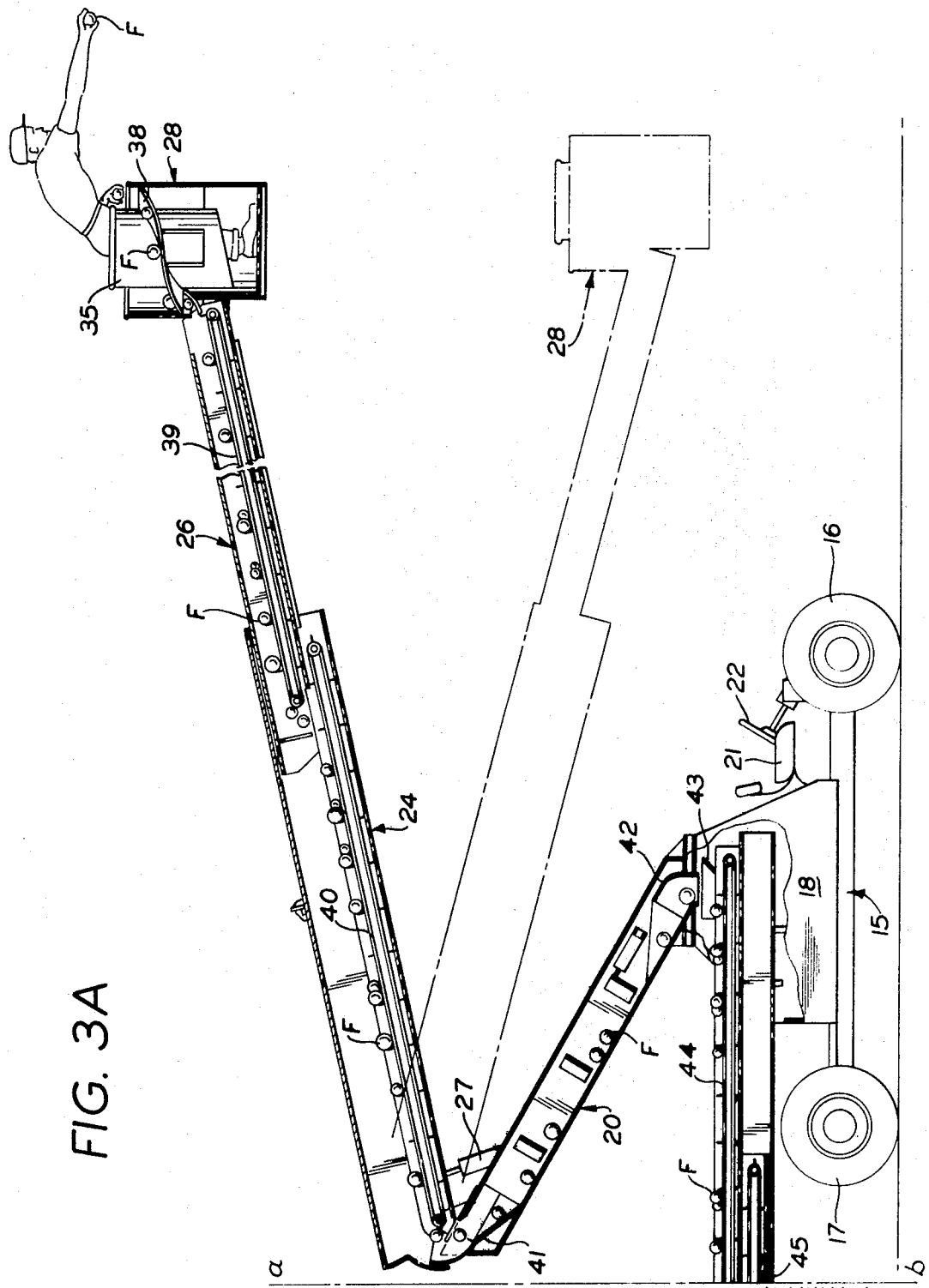

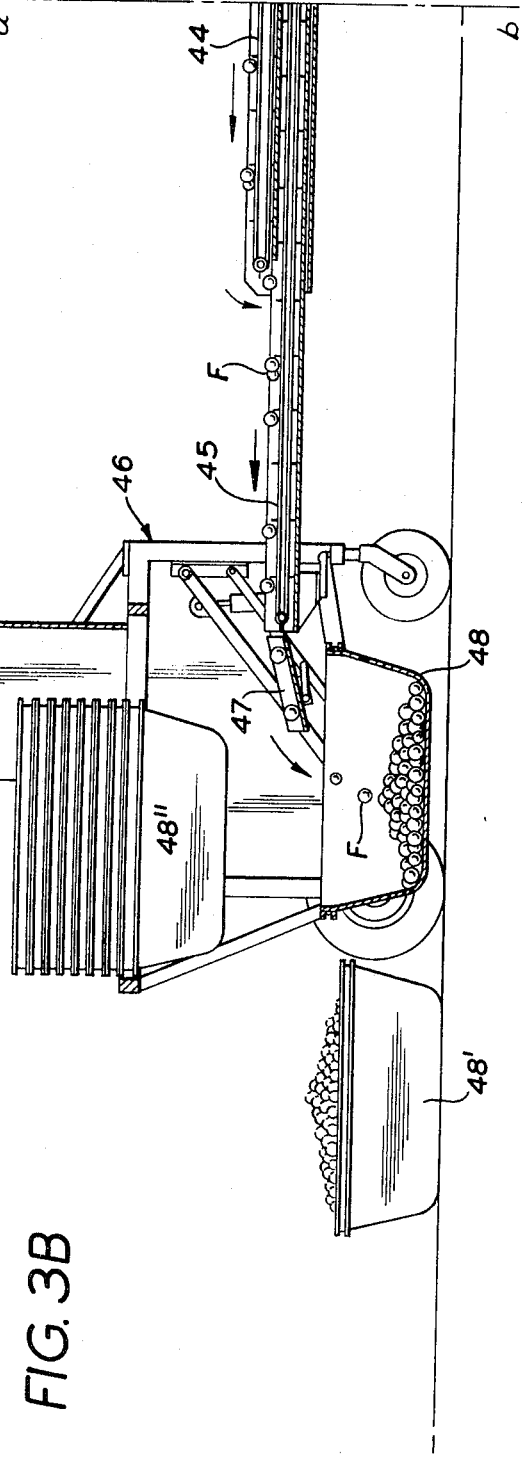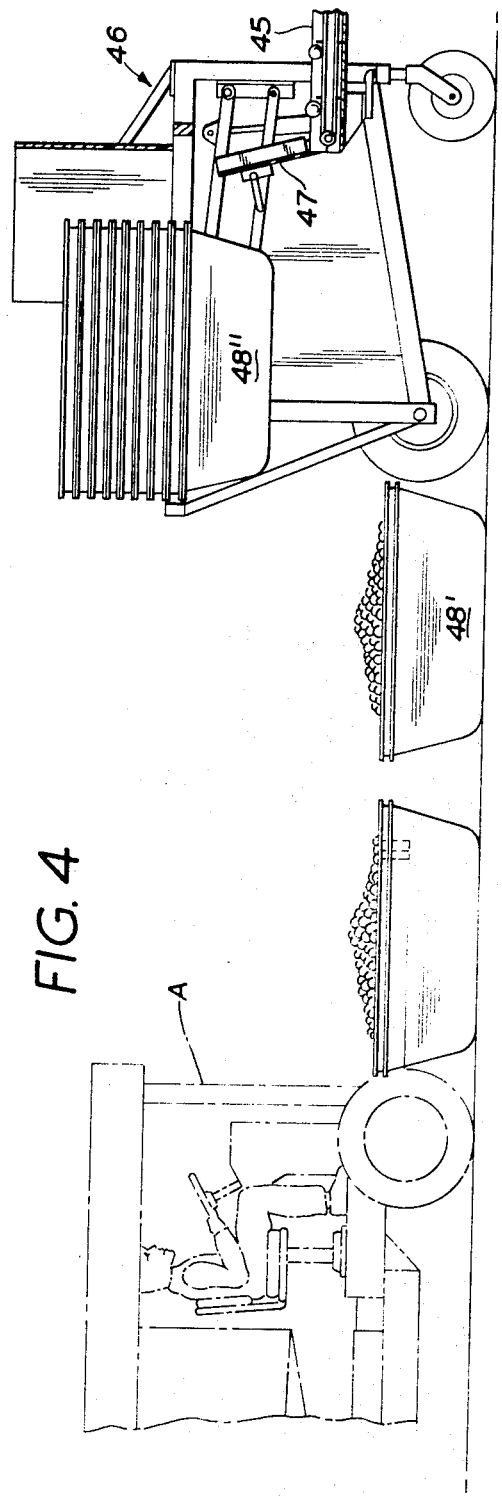
FIG. 3B
FIG. 4

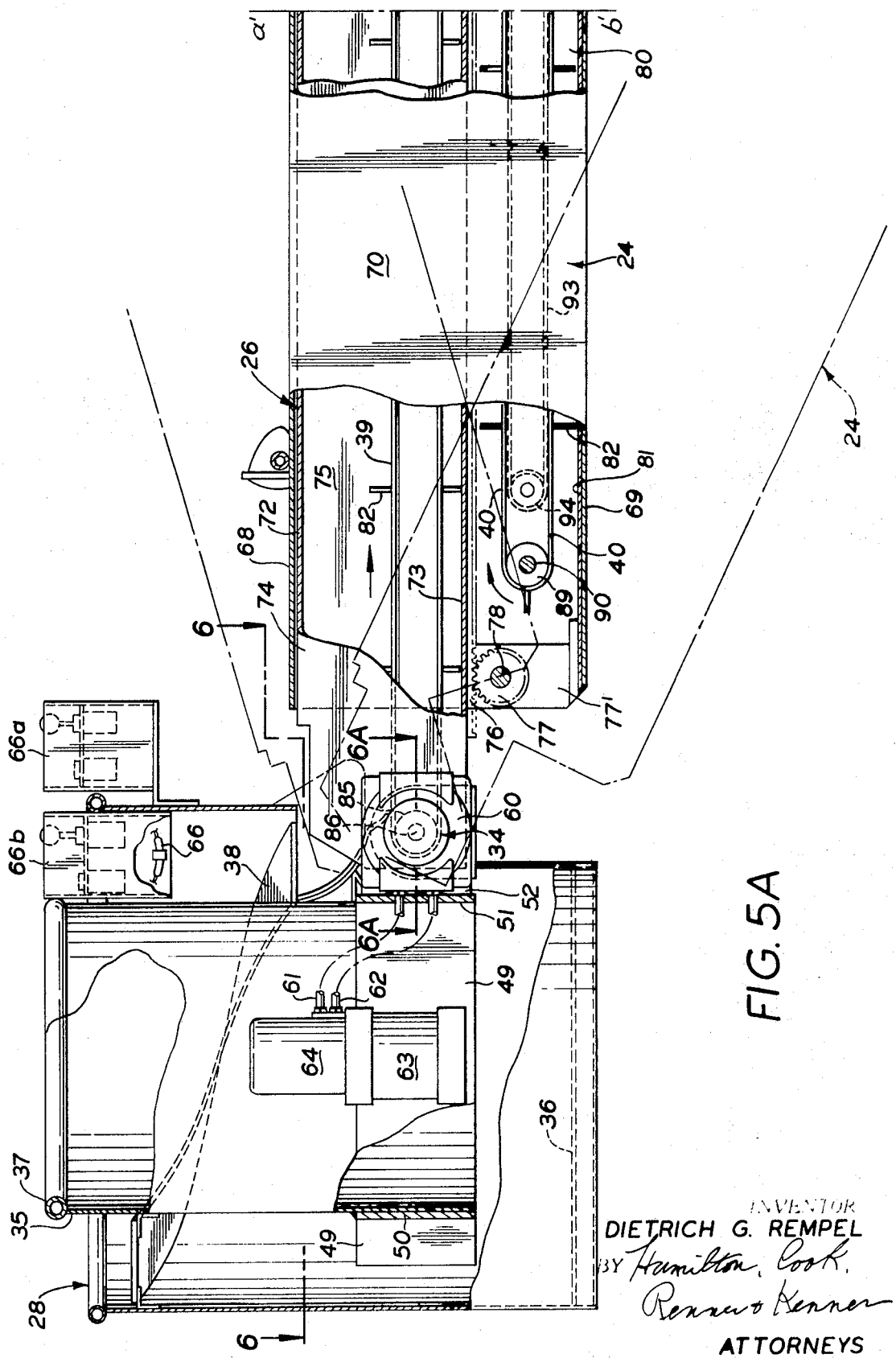

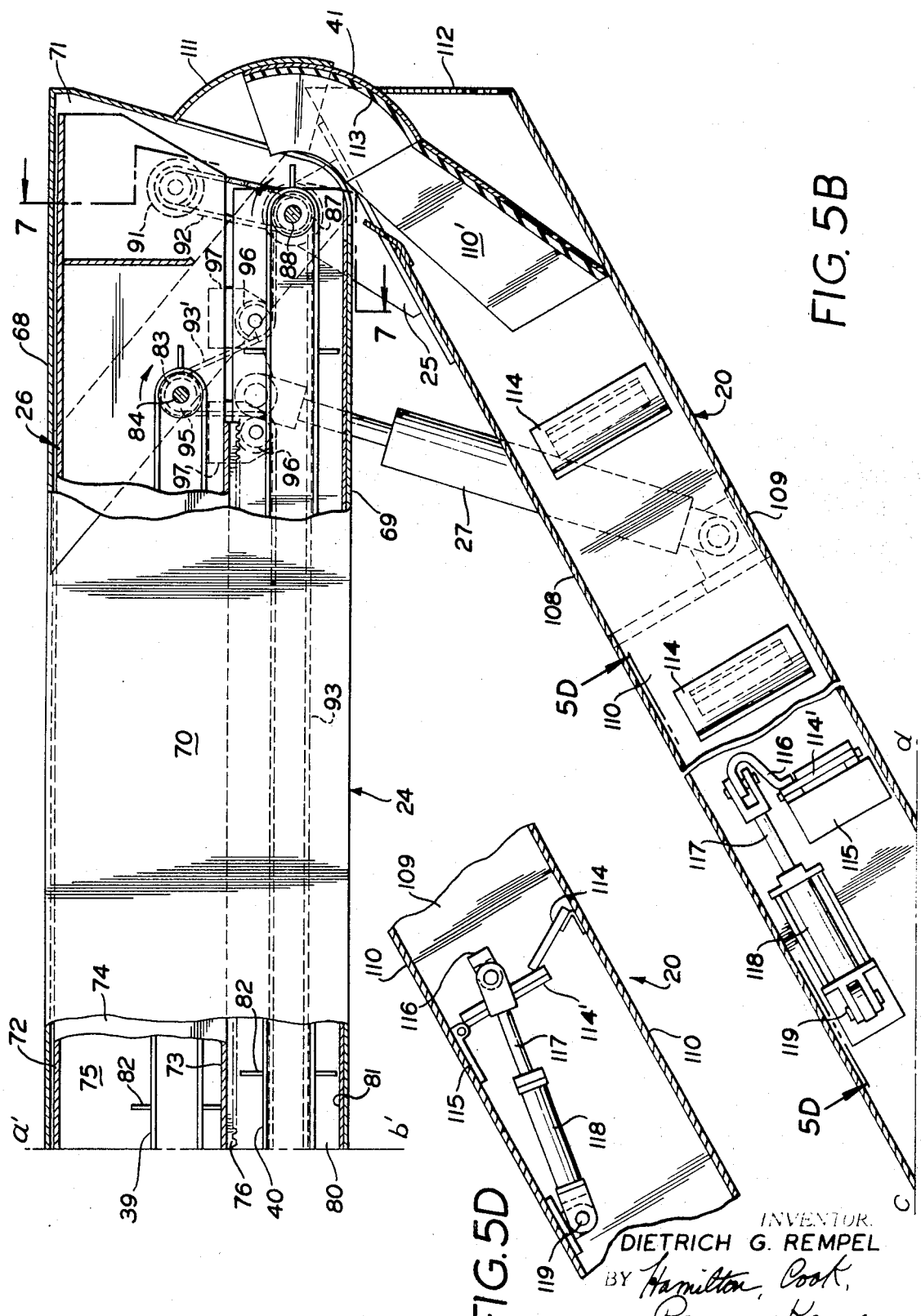

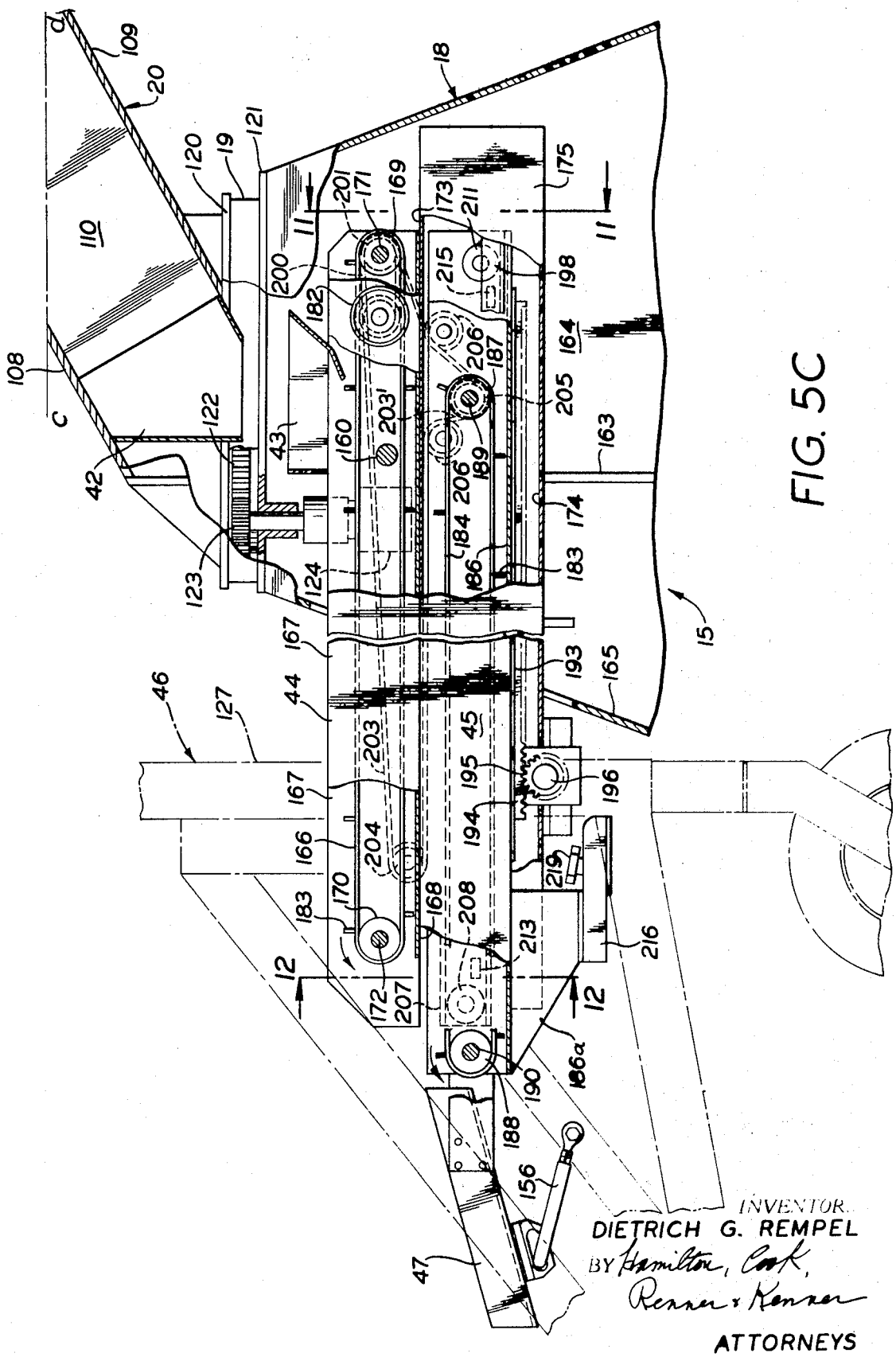

INVENTOR.
DIETRICH G. REMPEL
BY Hamilton, Cook,
Renner & Kenner
ATTORNEYS

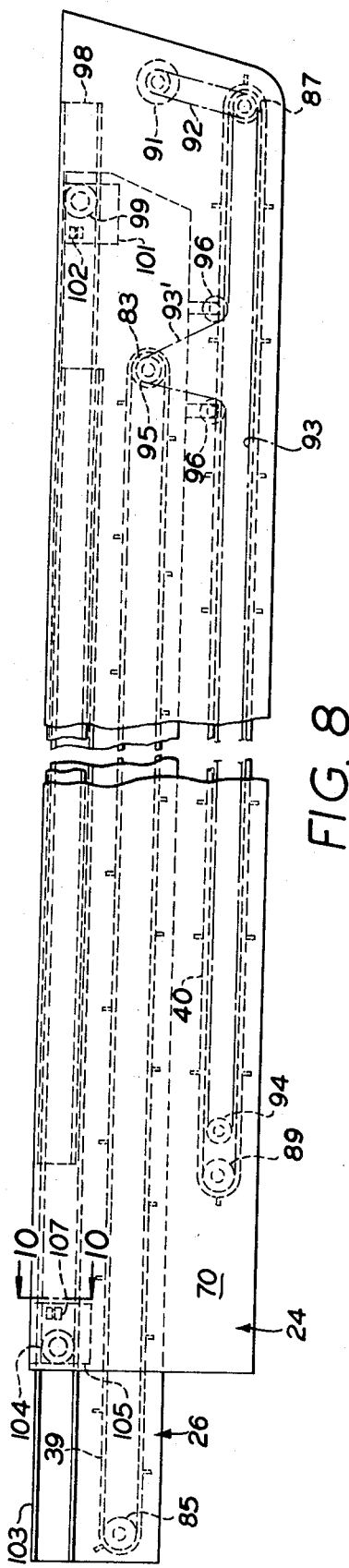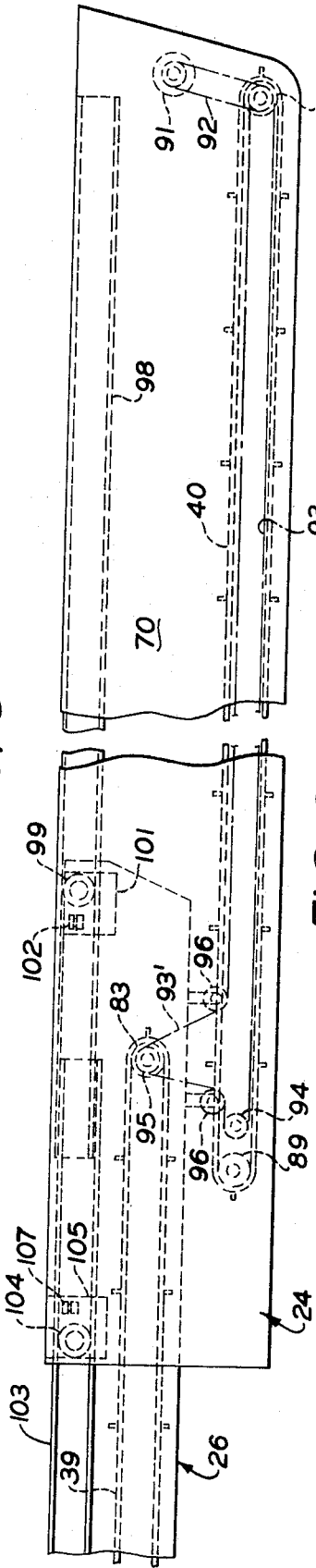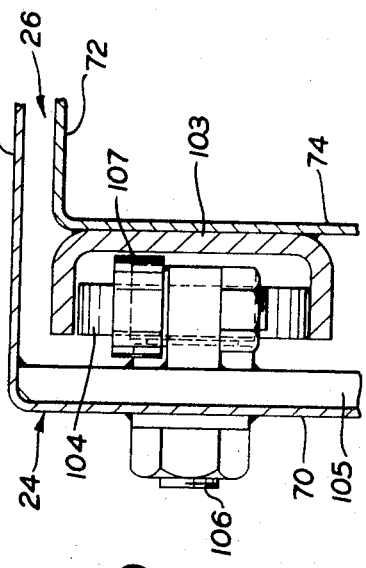
FIG. 8
FIG. 9
FIG. 10
INVENTOR.
DIETRICH G. REMPEL
BY Hamilton, Cook,
Renner & Kenner
ATTORNEYS INVENTOR.
DIETRICH G. REMPEL
BY Hamilton, Cook,
Renner & Kenner
ATTORNEYS

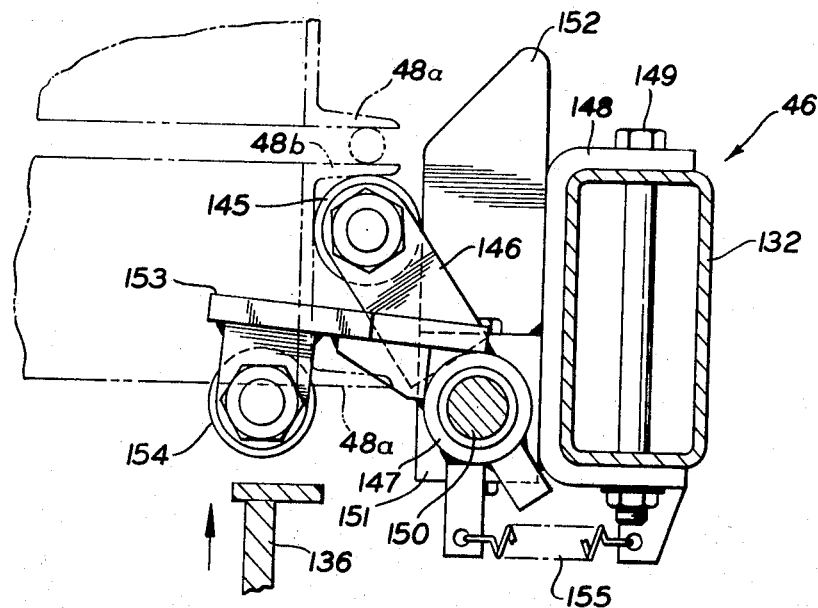
FIG. 15
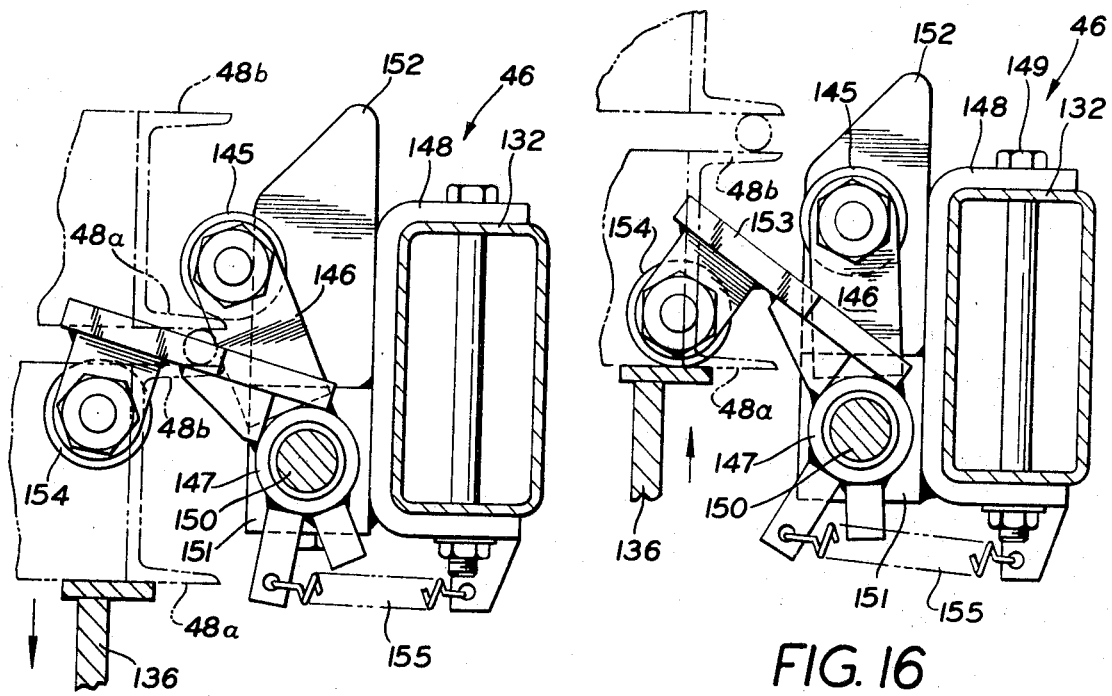
FIG. 17
FIG. 16
INVENTOR.
DIETRICH G. REMPEL
ATTORNEYS

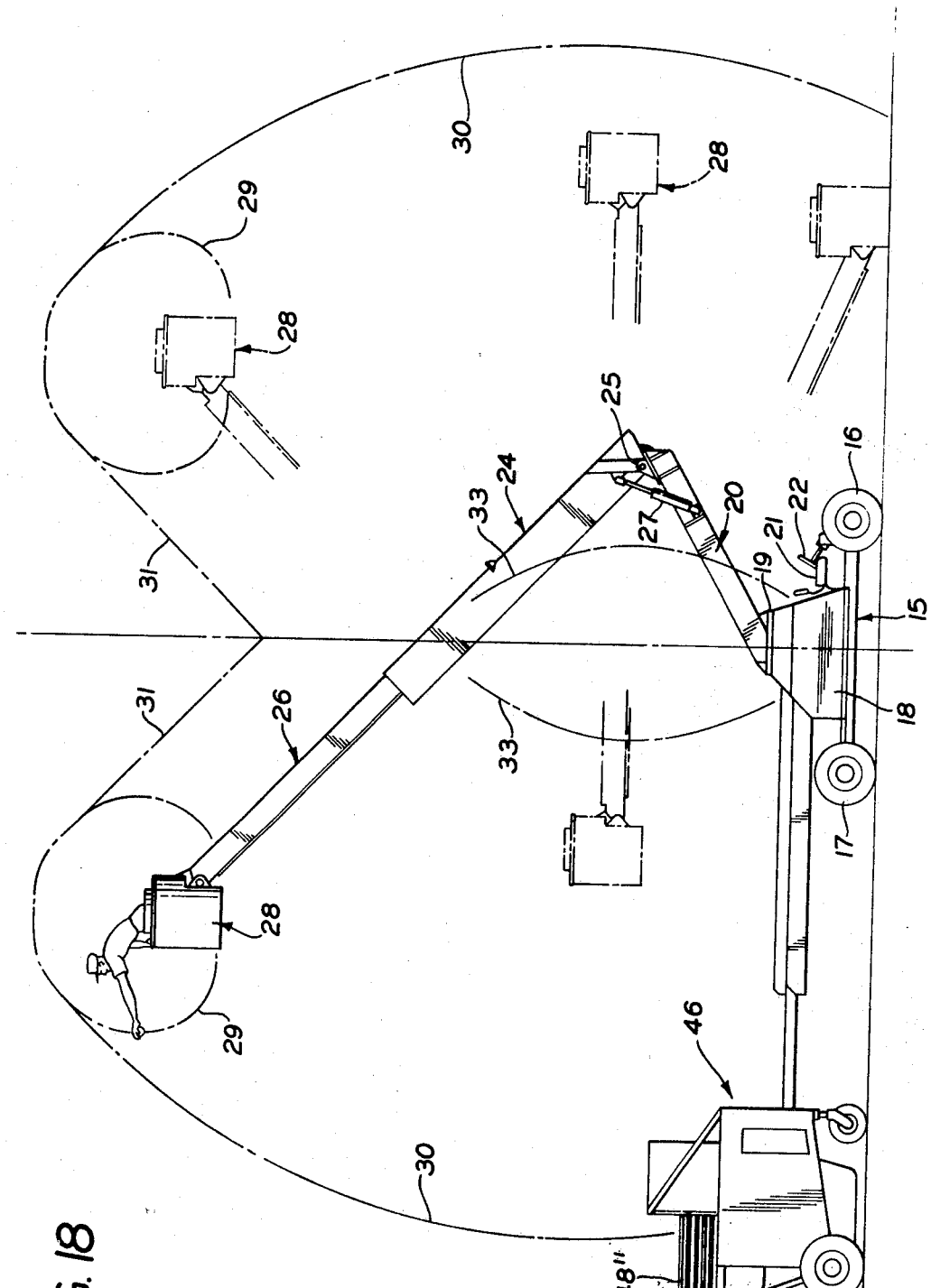

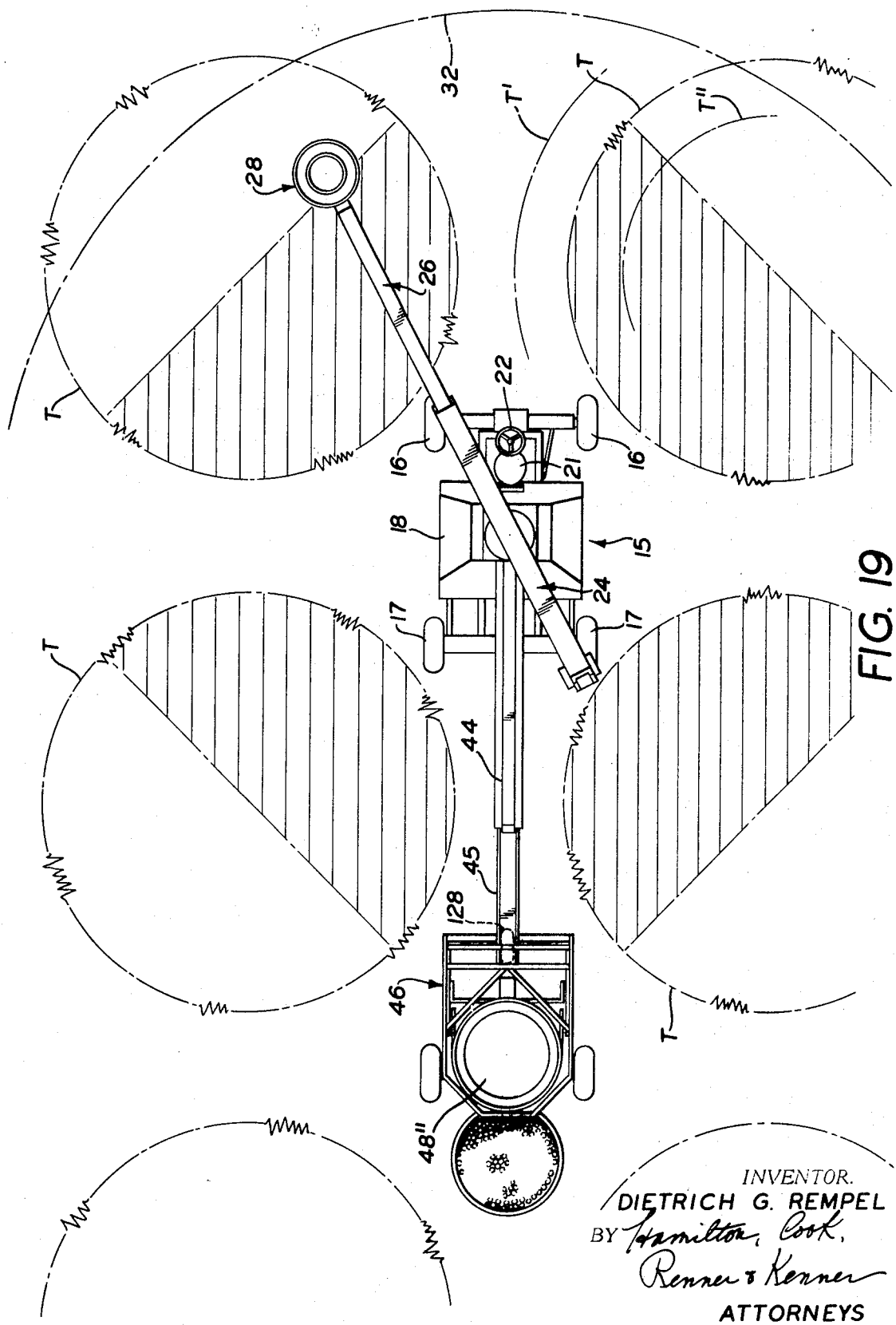

3,633,336

FRUIT-PICKING APPARATUS

BACKGROUND OF THE INVENTION

For many years the harvesting of commercial orchards bearing various kinds of fruit was done by hand picking from ladders into sacks carried by the pickers. In recent years the scarcity of labor and rapidly increasing labor costs have spawned a variety of mechanical picking devices and systems, especially for use in the citrus-growing industry where the demand for juice concentrate has been increasing by leaps and bounds, and a vast amount of time and money has been spent in experimentation and development toward reducing picking costs.

Various mechanical devices for reaching into the trees and picking oranges one or a few at a time have been proposed, but these are much too slow and are difficult to manipulate so as to do a thorough job of picking. Other devices involve mechanically shaking the trees and providing inclined platforms or surfaces to catch the fruit and deliver it to conveyors, as disclosed in U.S. Pat. Nos. 3,218,790 and 3,250,065. One difficulty with these devices is that the fruit should not be ripe enough to bruise and it therefore requires vigorous shaking to dislodge it, resulting in potential damage where the shaking devices contact the tree trunk and branches, as well as damage to the tree root system, normally growing in sandy soil. In many cases such vigorous shaking knocks off some leaves and, when blossoms and immature fruit are also present, as is the case with certain varieties of fruit, some blossoms and green fruit are also shaken off, with consequent loss of fruit crop.

It has been proposed to apply a multiplicity of high-velocity jets of air, as in U.S. Pat. No. 3,114,998, to shake or vibrate the fruit loose, in order to avoid damage to the tree trunk and branches, but the high-velocity jets tend to damage the leaves and smaller branches, as well as blossoms and green fruit if present. In recognition of the damage to the trees resulting from the vigorous shaking required by this system of picking, it has been attempted to spray the trees bearing the ripening fruit with a chemical compound formulated to cause the fruit stems to become detached with less vigorous shaking, but this treatment to be effective requires time in advance of picking and also detracts from the health and yield of the trees, especially if blossoms are present.

The safest picking procedure from the standpoint of damage to the fruit and to the trees is still hand picking, and it is the primary object of the present invention to provide a novel and improved system of hand picking which will substantially increase the picking production while reducing the number of pickers. U.S. Pat. No. 2,450,152 discloses a fruit picker's crane, designed to take the place of a ladder and save the time and effort of climbing up and down the ladder and constantly changing its position. This crane has an articulated boom mounted on a truck, the upper arm having a picker's seat at its outer end and the arm being a hollow chute to allow the fruit to roll down by gravity into a hopper attached to the lower arm, and fruit collected in the hopper is removed from time to time.

The fruit picker's crane of said U.S. Pat. No. 2,450,152 has a number of disadvantages. The maneuverability of the picker's seat is limited by the fact that neither of the arms of the boom are per se extensible, the overall extensibility being limited to operating the arms as levers pivoted to each other. The maneuverability of the picker's seat is further restricted because it always faces in the same direction so that the picker can not turn around and pick fruit behind him.

The conveyance of fruit to the hopper is dependent upon gravity which precludes picking fruit with the upper arm at or below horizontal, as would be required to pick fruit from the underside of a tree. It is well known that many fruit trees have a substantial number of low hanging branches bearing fruit, and this is especially true to citrus trees. The result is that the low hanging fruit can not be picked from the picker's seat and conveyed to the hopper, but must be separately picked and handled. The hopper of said fruit picker's crane requires hand labor to empty it from time to time into field boxes and hand labor to transfer the boxes to trucks for carrying them to a juice plant or a central packing house or distribution point.

SUMMARY OF THE INVENTION

It is a general object of the present invention to provide a novel apparatus and method for hand picking fruit from orchards which will overcome the disadvantages of prior devices and reduce the hand labor required to a minimum.

Another and more specific object is to provide a novel and improved apparatus having an articulated boom with a picker-supporting bucket at the outer end of the upper arm adapted to allow picking in full circle and dropping the fruit directly into a receiving trough from any position.

Another object is to provide a novel extensible upper boom arm enclosing coextensible conveyor mechanism for positively conveying fruit in any position of inclination of the arm, together with improved means for conducting fruit from the upper arm into the lower arm.

A further object is to provide improved throat means on the vehicle rotatably supporting the lower arm and receiving fruit discharged therefrom.

A still further object is to provide improved extensible conveyor means on the vehicle for conveying fruit rearwardly from said hopper.

Another object is to provide a novel mechanism for supporting a stack of empty containers on the vehicle and removing one container at a time therefrom to place it in position to receive fruit from the rear end of the conveyor, and depositing each container when filled upon the ground, to the rear of the empty container in fruit-receiving position.

Still another object is to provide a novel method of picking fruit utilizing the novel apparatus, in which the vehicle is positioned between two rows of trees and centrally of two opposed pairs of trees, and controlling at the picker's bucket the operations of manipulating the bucket to progressively make available for picking all of the fruit from at least the radially adjacent spherical halves of the four trees, conveying picked fruit to the hopper and from the hopper rearwardly, supporting an empty container in fruit-receiving position, depositing the filled container on the ground and positioning another empty container in fruit-receiving position forwardly of the deposited container.

These and other collateral objects are accomplished by the novel and improved mechanisms, arrangements and combinations comprising the present inventions, preferred embodiments of which are shown herein by way of example, the scope of the inventions being defined in the appended claims.

In the drawings:

FIG. 2 is a plan elevation thereof on a slightly larger scale.

FIG. 3A is a partial side elevation, partly in section, forwardly of the vertical plane a–b, showing the upper arm of the boom partially unfolded and extended forwardly.

FIG. 3B is a partial side elevation, partly in section, rearwardly of the plane a–b, showing the conveyor on the supporting vehicle partly extended and a container supported in fruit-receiving position at the rear of said conveyor in front of a filled container previously deposited on the ground.

FIG. 4 is a similar view showing the container-supporting mechanism in position to transfer an empty container from a stored stack to fruit-receiving position.

FIG. 5A is an enlarged partial side elevation, partly in section, of the picker-supporting bucket, shown mounted on the outer end of the upper arm from plane $a'-b'$ of the upper arm in retracted position.

FIG. 5B is an enlarged partial side elevation, partly in section, of the inner end from plane $a'-b'$ of the retracted upper arm, showing the upper end from plane c–d of the connected lower arm.

FIG. 5C is an enlarged partial side elevation, partly in section, of the lower end of the lower arm from plane c–d, showing its mounting on the supporting vehicle, which is partly broke away.

FIG. 5D is a partial sectional view on line 5D—5D of FIG. 5B.

FIG. 6A is an enlarged plan view on line 6A—6A of FIG. 5A, partly in section, of the picker-supporting bucket in FIG. 6.

FIG. 8 is a side elevation, partly broken away, of the upper arm detached from the lower arm and the picker bucket, with the upper conveyor thereof slightly extended.

FIG. 9 is a similar view with the upper conveyor fully extended from the upper arm.

FIG. 10 is a partial sectional view on line 10—10 of FIG. 8.

FIGS. 15, 16 and 17 are enlarged fragmentary views on line 15—15 of FIG. 14, showing different positions of the container-supporting mechanism in removing an empty container from the bottom of the stack of empty containers.

FIG. 18 is a schematic side view of the apparatus, showing various positions of the picker-supporting bucket in picking fruit from the adjacent spherical halves of two trees in a row, which can be different sizes and heights.

FIG. 19 is a schematic plan view showing the supporting vehicle and its boom located centrally of opposed pairs of trees in two rows, for picking the radially adjacent spherical halves of four trees, or more or less areas of trees depending upon size.

DESCRIPTION OF THE PREFERRED EMBODIMENT

Figure 1:
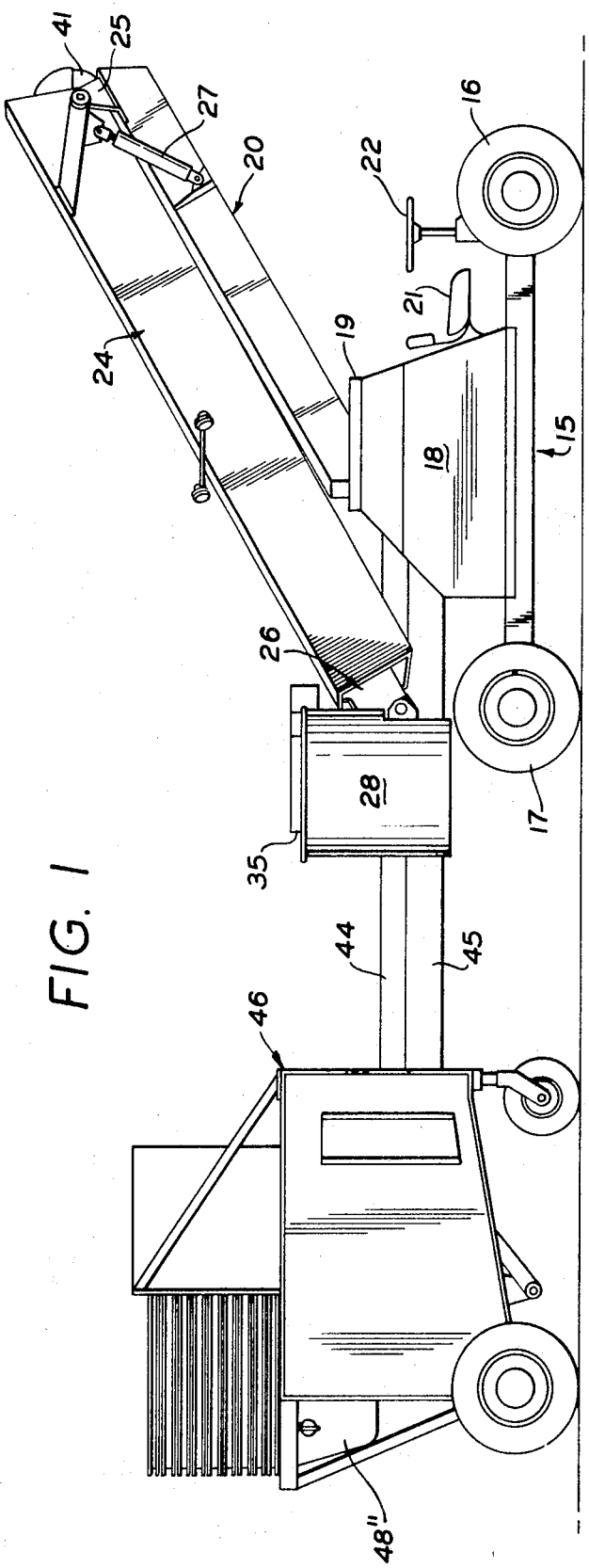
FIG. 1 is a side elevation of the improved fruit-picking apparatus showing the articulated boom folded with the picker-supporting bucket in lowered and retracted position.

Referring to FIGS. 1, 2, 18 and 19, the novel and improved fruit-picking apparatus has a base-supporting vehicle comprising a forward truck indicated as a whole at 15, having front wheels 16 and rear wheels 17 carrying a chassis on which a hollow substantially pyramidal housing 18 is supported. At the top of the housing is a circular bearing assembly 19 rotatably supporting the lower hollow arm 20 of the boom at a fixed inclination to the horizontal. A driver's seat is shown at 21 at the front of housing 18, and a steering wheel 22 is located in front of the seat and is operatively connected to the front wheels for steering them in a well-known manner. As shown in FIG. 3A, the wheel 22 can be folded down onto the seat to provide clearance for the boom to swing by. The power for moving the vehicle may be supplied by hydraulic individual wheel motors, or other suitable motor means (not shown).

The upper arm 24 of the boom is hinged at its inner end to the outer end of the lower arm by hinge brackets 25 so that arm 24 can be folded down alongside the top of lower arm 20, as in FIGS. 1 and 2, for transporting the vehicle from place to place, and can be unfolded to various angular positions such as shown in FIG. 18 for picking fruit. The arm 24 is of hollow rectangular shape in cross section, and a slidable hollow rectangular arm 26 of smaller dimensions is telescopically and extensibly mounted within the arm 24. The means for folding and unfolding the arm 24 on the lower arm 20 preferably comprises hydraulic cylinders 27 connecting the outer walls of the arms 20 and 24 adjacent the hinge brackets 25.

The mechanism for extending and retracting the arm 26 will be described hereinafter. Also, the arms 24 and 26 enclose coextensible belt conveyors which will later be described in detail. These belt conveyors positively convey fruit through the arms 24 and 26 and into lower arm 20, regardless of the extended position of arm 26, and regardless of the inclination of arms 24 and 26, including positions of upward inclination of the arms from the outer end to the inner hinged end, in a manner to be described.

The picker-supporting bucket 28 is pivotally mounted on the outer end of arm 26, and is preferably an open top cylinder as shown, so that a man standing in the bucket can lean out and reach in all directions, full circle, to pick fruit F from one position of the bucket in a substantially spherical area a substantial circle of which is indicated at 29 in chain lines in FIG. 18. Leveling means, hereinafter described, are provided to maintain the bucket level automatically regardless of the positions of the supporting boom arms, as also indicated in FIG. 18. It will be apparent that because the lower arm 20 is reversely inclined to the upper arms 24 and 26, the tilting effect on the base vehicle 15 caused by the overhang of the bucket is at least partially counterbalanced in all positions of the bucket. In any event, when the boom is fully extended in a lateral direction, the weight of the base vehicle 15 is approximately five times the effect weight of a man in the bucket 28.

The picker's full area range, from a position of the base vehicle centrally of four average size trees indicated schematically at T in FIG. 19, is indicated in FIG. 18 in one vertical plane by the curved dot-dash lines 30 and intersecting upper and angular lines 31. By rotating the lower arm 20 on the base, the maximum horizontal cross section of this range area is bounded by the outer circle 32 shown in FIG. 19, so that the whole area is substantially spherical, with an inaccessible upper conical area within lines 31, and a lower inaccessible central area within the curved lines 33. These two inaccessible areas are located directly above the location of the base vehicle centrally of the four trees T where no branches or fruit are present.

Accordingly, from the base vehicle position of FIG. 19, by rotating the lower arm 20, folding and unfolding the upper arm 24, and extending and retracting the upper arm 26, the picker can completely pick all of the fruit from at least the adjacent inner spherical halves of the four trees T, as represented by the shaded areas in FIG. 19. With the upper arms fully extended, the picker can swing over and pick from the tops of trees about 35 feet high having broader girths as indicated at T'. In the case of smaller trees, such as indicated at T'', the picker can swing over the top and around the rear side of the tree so as to pick all or substantially all of the tree depending upon its size.

Referring to FIG. 5A, the picker-supporting bucket 28 has an inner cylindrical enclosure 35 positioned concentrically within the outer cylindrical bucket, and the picker stands within the cylinder 35 with his feet on the floor 36 of the bucket. The top annular rail 37 of cylinder 35 is positioned so that it will comfortably support the picker as he leans outwardly to reach fruit by pressing against the rail below his waist and just above his thighs, the rail being suitably rounded.

The picker picks with both hands while turning his body in any direction and drops the fruit into the trough formed between the bucket 28 and the inner cylinder 35, where it is conducted by semicircular, downwardly inclined chutes 38 onto the adjoining end of the conveyor belt in the upper arm 26 pivoted to the bucket at 34. As best seen in FIGS. 3A and 3B, the fruit is conveyed from belt 39 to belt 40 in arm 24, and then by gravity through a connector chute 41 into lower arm 20, at the lower end of which the fruit passes through a delivery chute 42 into a receiving throat 43 within the housing 18 and thence onto the forward end of the upper of two longitudinally extensible conveyors carried on the base vehicle 15.

The fruit is conveyed rearwardly by the upper belt conveyor 44, and as shown in FIG. 3B, regardless of the amount of rearward extension of the lower belt conveyor 45 beyond conveyor 44, the fruit is conveyed by conveyor 45 to a discharge location within the frame of a rear vehicle indicated generally at 46 which supports the rear end of conveyor 45 when the conveyor is fully retracted as in FIG. 5C, or in various extended positions such as shown in FIG. 3B.

At the rear end of conveyor 45 the fruit passes over a normally downwardly inclined discharge chute 47 and drops into a large fruit collecting receptacle 48 supported on the lower part of the vehicle frame 46 a short distance above the ground. Mechanism to be described supports and lowers the receptacle when full and deposits it onto the ground, and the vehicle 46 is moved forwardly by conveyor 45 to clear the deposited receptacle shown at 48'. The conveyor 45 is normally fully extended when the first receptacle in a row is deposited, although the amount of extension can be controlled to suit specific conditions, and the vehicle 46 is moved forwardly and the conveyor 45 retracted, step-by-step, each time a full receptacle is deposited.

Mechanism is also provided to remove the empty receptacle 48" at the bottom of the stack of empty receptacles stored at the top of frame 46, and lower it to the supported position of receptacle 48. During this transfer operation, the discharge chute 47 is raised out of the way as shown in FIG. 4 until the next receptacle 48 is in fruit receiving position.

When a row of successively deposited full receptacles has been deposited, as indicated in FIG. 4, a lifting and collecting truck such as shown at A can successively pickup the deposited receptacles to dump them into a hopper on the truck and then convey large quantities of fruit to a transfer vehicle and thence to a juice concentrate plant or other processing center. Thus, the collecting truck A follows the same line between rows of trees as has been traveled by the picking truck, and one collecting truck can service simultaneously several rows of full receptacles 48 and return empty receptacles, as the fruit is picked.

PICKER BUCKET APPARATUS

Figure 6:
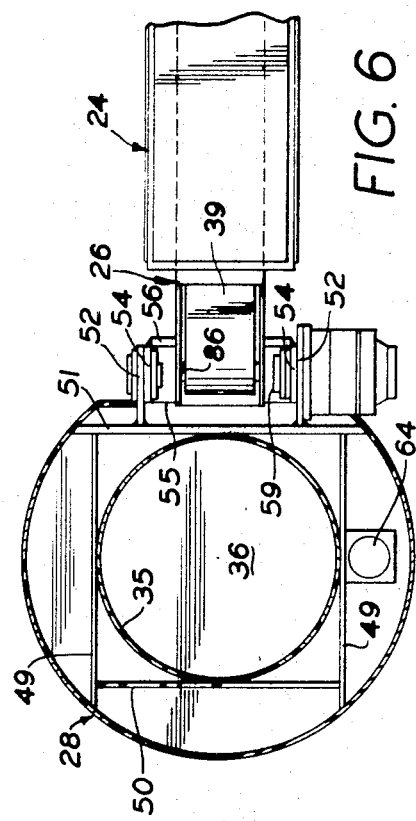
FIG. 6 is a plan sectional view of the picker-supporting bucket, on line 6—6 of FIG. 5A, showing the pivotal mounting of the bucket on the upper arm in elevation.

Referring to FIGS. 5A, 6 and 6A, the inner cylinder 35 is secured in spaced relation within the outer bucket 28 by rectangularly arranged vertically disposed plates 49, 50 and 51, welded at their ends to the inner surface of bucket 28, and at intermediate locations tangentially to the inner bucket 35. The bucket assembly is pivoted on the outer end of the upper boom arm 26 by spaced bracket plates 52 welded to and extending outwardly from plate 51, one on each side of the arm 26.

As best shown in FIG. 6A, the pivot connections 34 may include bearing plates 54 rotatably abutting the bracket plates 52 and welded to the end of arm 26 by angular plates 55 and 56. A centering stub shaft 57 extends through each plate 52 and has a pilot flange 58 around its inner end. The outer end of one shaft 57 is splined into an annular centering member 59 which fits within and is secured to the bearing plate 54. One of the stub shafts 57 is keyed into a rotary hydraulic actuator 60, which is driven by hydraulic fluid conducted through conduits 61 and 62 from a combined reversible motor 63 and pump 64 supported on one of the plates 49 within the bucket 28.

Thus, when the actuator 60 is rotated the plates 52 and the whole bucket assembly rotates on bearing plates 54 around the stub shafts 57 as centers. The direction and amount of rotation is controlled so that the bucket is maintained substantially horizontal as the inclination of the boom arm 26 is changed to accommodate various positions. The control mechanism may comprise a mercury leveling switch of well-known construction mounted on the bucket and indicated schematically at 66 in FIG. 5A. The switch is electrically connected to motor 63 so that when the bucket tilts a predetermined amount (e.g. 5°) in either direction the mercury makes contact to drive the motor and the actuator 60 in the proper direction to return the bucket to substantially horizontal position.

As schematically indicated in FIGS. 2 and 5A, control panels 66a and 66b are provided preferably above the pivot connections between the bucket and the upper boom arm, and conveniently located for operation by the picker. These controls permit the picker to control the entire picking operation from his position within the bucket including, driving the vehicle 15, maneuvering his position in all directions by rotating the lower boom arm, changing the inclination of the upper arm, and extending and retracting the upper arm conveyors; depositing each receptacle 48 when filled and transferring an empty one from the storage stack to fruit receiving position, and moving the rear vehicle forwardly, step-by-step, as the filled containers are deposited.

THE EXTENSIBLE UPPER BOOM

Referring to FIGS. 3A, 5A, 5B and 7–10, the upper boom arm 24 has an outer metal housing which is rectangular in cross section, with top and bottom walls 68 and 69, and sidewalls 70 and 71. The upper arm 26 is telescopically slidable within the arm 24 and is also rectangular in cross section, with top and bottom walls 72 and 73, and sidewalls 74 and 75.

The means for extending and retracting the upper arm 26 relative to the arm 24 preferably comprises a rack bar 76 secured on and extending below the bottom wall 73 of the inner housing, the teeth of the rack bar engaging a gear 77 journaled in a bracket 77' mounted on bottom wall 69 of the outer housing. A separate drive motor (not shown) may be mounted on said bracket 77' and operatively connected to the shaft 78 of the gear 77, and the motor is electrically connected in a well-known manner to a control switch on the control panel 66a and 66b.

An endless belt conveyor indicated generally at 39 is mounted within the inner housing and an endless belt conveyor 40 is mounted immediately below conveyor belt 39 within a U-shaped housing having sidewalls 79 and 80 and a bottom wall 81 secured to bottom wall 69 of the outer housing for arm 24. The belts 39 and 40 have spaced flights or vanes 82 thereon to facilitate conveying fruit deposited thereon.

The upper belt 39 is trained around a drive pulley 83 on a shaft 84 at its inner end and around an idler pulley 85 on a shaft 86 at its outer end. The shaft 84 is journaled in the sidewalls 74 and 75 of the inner housing, and the shaft 86 is journaled in the outer ends of those sidewalls in line with the pivot connections 54 (FIG. 6). The lower belt 40 is trained around a drive pulley 87 on a shaft 88 at its inner end and around an idler pulley 89 on a shaft 90 at its outer end. The shafts 88 and 90 are journaled in the sidewalls 79 and 80 of the U-shaped housing.

The means for driving the conveyor belts 39 and 40 in all positions of extension and retraction of the upper conveyor as controlled by rack 76 and gear 77 comprises a drive motor 91 preferably mounted on sidewall 71 of the outer housing (FIG. 7) and driving a sprocket chain 92 within said housing wall. The chain 92 is meshed with a sprocket on shaft 88 for driving shaft 88 and drive pulley 87 thereon to drive conveyor belt 40. A second sprocket on shaft 88 drives a chain 93 spaced inwardly of chain 92, and chain 93 passes around an idler and takeup sprocket 94 mounted on sidewall 80 near the idler pulley 89.

The upper run of chain 93 is trained upwardly in a traveling loop 93' which passes around a sprocket 95 on the drive shaft 84 to drive the drive pulley 83 for the upper belt 39. The loop 93' is formed by two idler sprockets 96 meshing with the upper run of chain 93. Sprockets 96 are mounted on bracket plates 97 secured to the side plate 75 of the inner housing.

Figure 7:
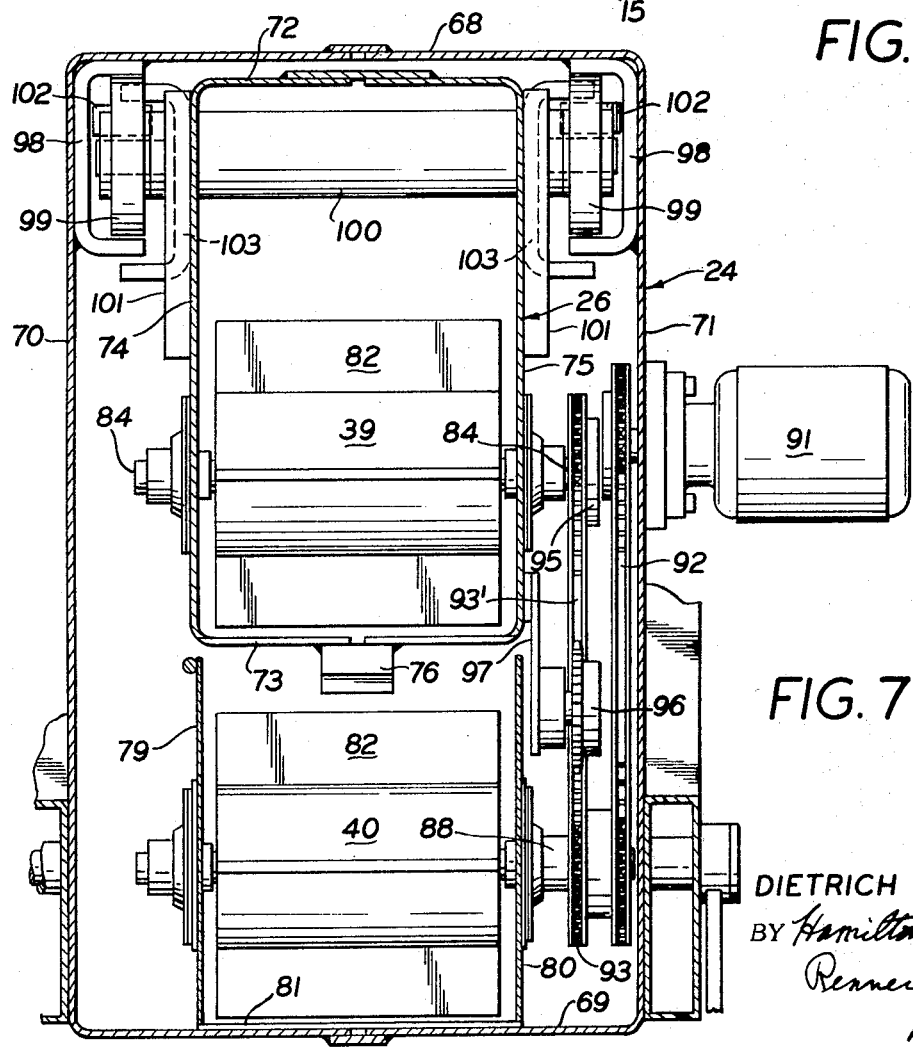
FIG. 7 is a cross-sectional view of the upper arm on line 7—7 of FIG. 5B.

Referring to FIGS. 7-9, as the upper arm 26 is extended out of arm 24 by rotation of gear 77 engaging rack bar 76, the idler sprockets 96 walk along the upper run of chain 93 and carry the traveling loop 93' with the sprocket 95 on the drive shaft 84 for pulley 83. Hence the chain 93 continues to drive the upper belt 39 in all positions of extension and retraction of the upper arm 26.

In all positions of extension and retraction, the arm 26 is rollably supported on track means with the housing 24. As seen in FIGS. 7-9, channels 98 are welded in the upper corners of housing 24, with their legs turned inwardly, and these channels extend longitudinally of the housing from points near the inner end of arm 24 and terminate at points spaced from the outer end of arm 24. Rollers 99 positioned between the channel legs support the inner end of housing 26 on the channel tracks, the rollers being journaled by suitable antifriction bearings on a shaft 100 extending through the sidewalls 74 and 75 of housing 26 mounted in sideplates 101 welded thereto. Preferably, horizontal rollers 102 are journaled on the plates 101 adjacent to rollers 99 for abutting the inner surfaces of the webs of channels 98.

Channel tracks 103 are welded to the upper portions of sidewalls 74 and 75 of housing 26, and have their legs turned outwardly to overlap the legs of channels 98, and these channels extend longitudinally of housing 26 from its outer end to points spaced from the roller mounting plates 101 on the housing. As shown in FIGS. 8-10, rollers 104 rolling in the channels 103 are mounted on plates 105 welded to the upper ends of sidewalls 70 and 71 at the outer end of housing 24. These rollers are suitably journaled on stub shafts 106 secured in the plates. Preferably, horizontal rollers 107 are journaled on the plates 105 adjacent to rollers 104 for abutting the inner surfaces of the webs of channels 103.

As shown in FIG. 9, when the arm 26 is extended the inner end of the arm is supported on tracks 98 by the rollers 99, while the intermediate portion of the arm is supported by its tracks 103 on the rollers 104 carried on the outer end of arm 24. The tracks 98 and 103 movably overlap but terminate short of the respective rollers 104 and 99 so as not to interfere therewith.

THE INCLINED LOWER BOOM

Referring to FIGS. 5B, 5C and 5D, the inclined lower boom 20 is a hollow arm preferably rectangular in cross section with top and bottom walls 108 and 109 and sidewalls 110. At the upper end where the inner end of upper boom arm 24 is hinged thereon by brackets 25, the top wall 108 has an opening formed therein to receive fruit discharged from the conveyor belt 40. Within the opening a deflector chute 110' is mounted which has an upper curved portion slidably overlapping a depending curved deflector guide 111 on the inner end of arm 24, so that a closed deflector passageway is provided in all positions of the upper arm 24 for transferring fruit into the lower arm 20. The deflector chute 110' is supported on an end wall 112 at the top of boom 20, and preferably is provided with a liner 113 of rubber or other soft material to protect the fruit.

Within the boom at longitudinal intervals are flanged baffle plates 114 secured to and extending inwardly from the sidewalls 110. These plates retard the flow of the fruit as it rolls downwardly by gravity through the boom. Preferably near the lower end of the boom is a baffle plate 114' which is hinged to a plate 115 secured to one of the sidewalls 110 for swinging into overlapping relation with an opposite baffle plate 114 and momentarily stopping the flow of fruit through the boom. The plate 114' is pivotally connected by bar 116 to the piston 117 of a hydraulic cylinder 118 pivoted at 119 to sidewall 110, so that the flow of fruit can be halted when an empty fruit-collecting receptacle 48'' is being transferred into fruit-receiving position to replace a deposited full receptacle 48 at the rear end of the base vehicle 15.

The lower end of boom 20 merges into a metal hood 120 which terminates in the annular bearing assembly 19 rotatably supported on the top plate 121 of housing 18. Means for rotating the boom preferably comprises a ring gear 122 (FIG. 5C) secured within the bearing assembly and a drive pinion 123 meshing with the gear 122 and driven by a motor 124 suitably supported on housing 18, and controlled from the control panels 66a and 66b. Within the lower end of boom 20 is the delivery chute 42 which serves to funnel and guide the fruit downwardly into the sheet metal throat 43 mounted over the rear end of the upper horizontal conveyor 44 which conveys the fruit rearwardly toward the discharge chute 47.

MECHANISM FOR HANDLING FRUIT-COLLECTING RECEPTACLES

The mechanism for supporting a fruit receptacle 48 under the discharge chute 47 delivering fruit from horizontal conveyors 44 and 45, for depositing the receptacle when filled, and for transferring an empty receptacle from the storage stack to fruit-receiving position, is best shown in FIGS. 13-17. The mechanism is mounted on the frame of the rear vehicle 46 which has a pair of laterally spaced rear vertical frame members 125 supported on wheels 126, and a pair of laterally spaced front vertical frame members 127 connected by a cross frame member supported on a caster wheel 128. Frame-stabilizing bars 129 connect the lower ends of frame members 125 and 127.

Figure 14:
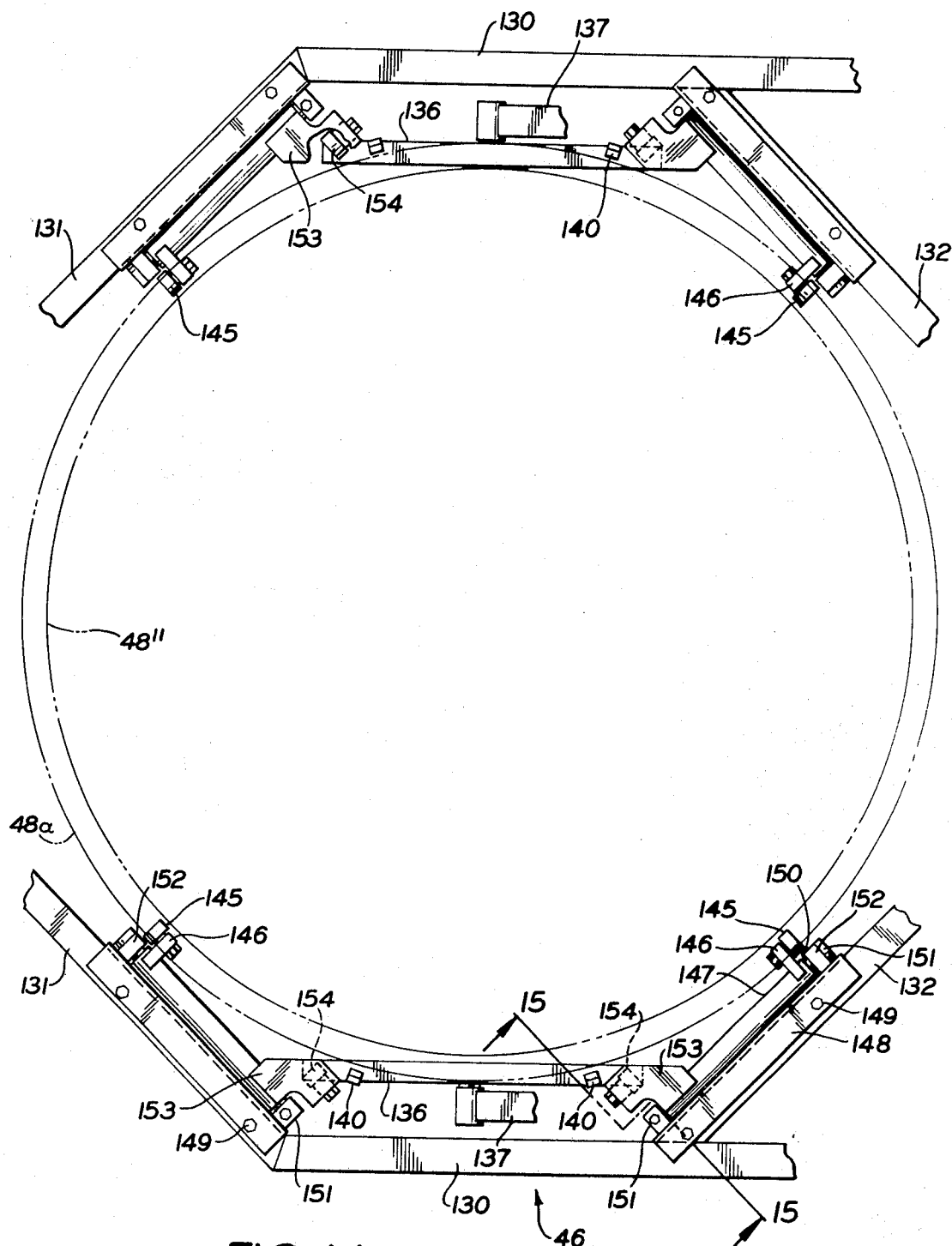
FIG. 14 is a plan elevational view on line 14—14 of FIG. 13.

The upper end of the frame includes laterally spaced bars 130 extending rearwardly from vertical front members 127 to rear members 125, and a framework of polygonal shape is carried between the bars 130 and surrounds and supports the bottom receptacle 48'' of the storage stack. This framework includes angularly disposed bars 131 and 132, as seen in FIG. 14. The sides and rear of the frame 46 may be enclosed by suitable plates 133 and 134, and a deflector hood 135 may be mounted atop the frame to deflect branches and leaves laterally outward as the vehicle is pulled forwardly between trees.

The mechanism for supporting a receptacle 48 in fruit-receiving position under the chute 47 preferably comprises a pair of T-shaped shoes 136 for engaging under the lower peripheral flange 48a of a channel-shaped rim on opposite sides of the receptacle. The rim has an upper flange 48b. Each shoe 136 is hingedly supported on the frame members 127 by a pantographic arrangement of parallel bars 137 and 138 pivoted at their upper ends to a bracket 139 on the frame and at their lower ends to the shoes, so that the upper supporting surface of each shoe is always horizontal when supporting and depositing the receptacles 48, and also when raised to engage the bottom receptacle in the storage stack, as indicated in phantom position in FIG. 13. Guide lugs 140 are provided on the upper surfaces of the shoes to aid in positioning them in engagement with the rim flange 48a.

Figure 13:
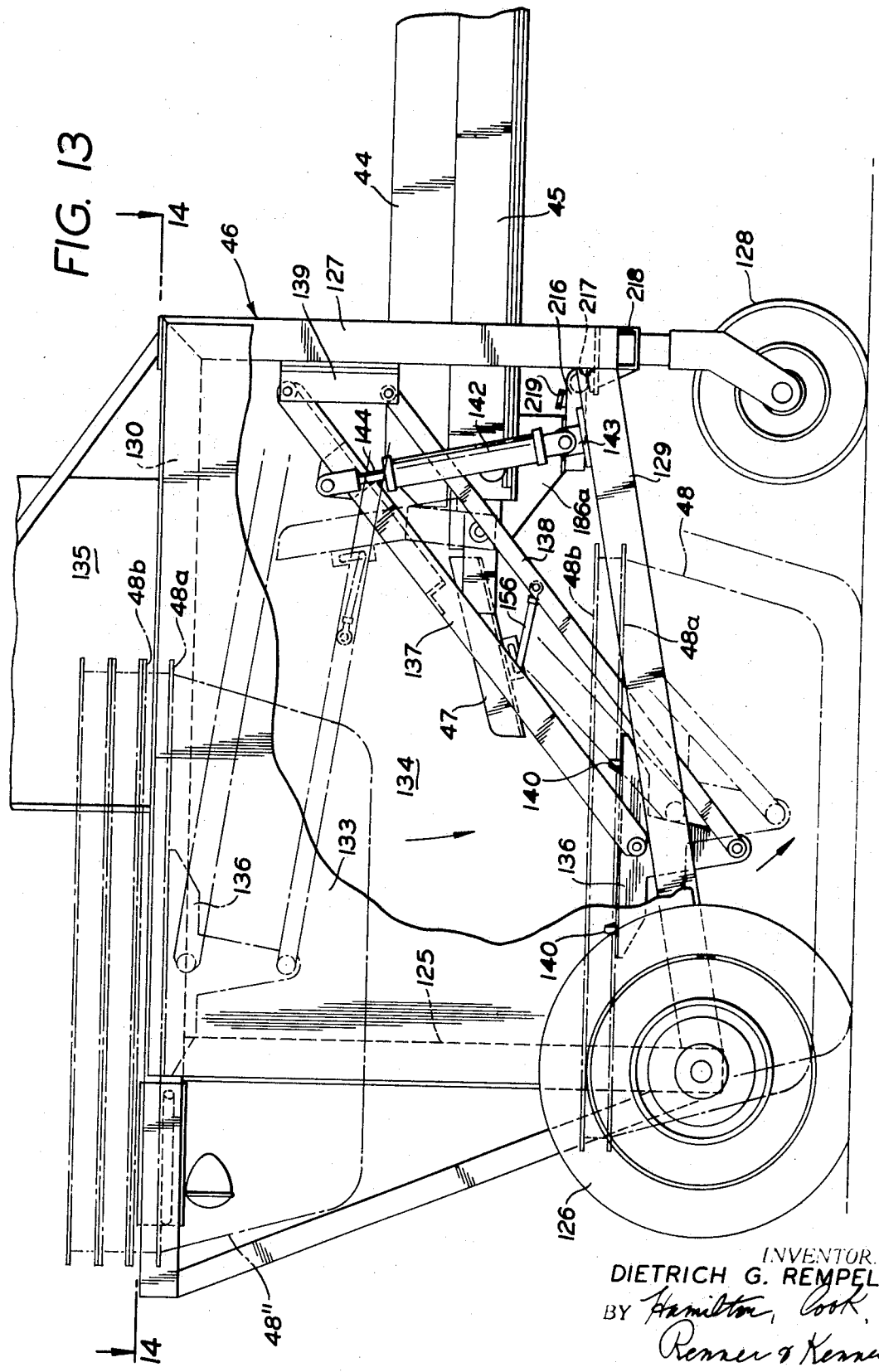
FIG. 13 is an enlarged partial side elevation, partly broken away, showing the manner of supporting the fruit containers at the rear of the supporting vehicle, and depositing filled containers therefrom.

In the full line position of FIG. 13, the shoes 136 engage under the rim flange 48a at diametrically opposite sides of a receptacle 48 to support it a short distance above the ground, the shoes being adjustably operated by hydraulic cylinders 142 pivotally mounted on brackets 143 and having their piston rods 144 pivotally connected to bars 137. When the receptacle is full, the pistons are actuated to lower the receptacle onto the ground, and the vehicle 46 is then pulled forward by conveyor 45 to slide the shoes from under the deposited receptacle and position them to support the next receptacle forwardly of the deposited one. Actuation of the pistons to lower the receptacle may be controlled by the picker on a signal actuated by a pressure switch operated by the weight of a full receptacle, and the transfer of a new empty receptacle and the pulling forward of the vehicle is automatically operated when the full receptacle has been deposited.

When the vehicle has been pulled forward a step to clear the deposited receptacle, the pistons 144 are actuated to raise the shoes 136 to the phantom position of FIG. 13, where they engage under the lower rim flange 48a of the bottom receptacle 48″ in the storage stack. This position of the shoes is also shown in FIG. 14. The stack of containers is normally supported by mechanism indicated in FIGS. 14-17, which normally engages under the upper rim flange 48b of the bottom receptacle. This mechanism comprises four roller supports 145 carried by the angularly disposed bars 131 and 132 and adapted to be tripped by the shoes 136 when they are raised to engage under the lower flange of the bottom stacked receptacle 48″.

The four roller supports are shown at 145 in FIG. 14 and they are each secured by a bracket 146 to a rod 147 rotatably mounted alongside a channel 148 secured to the frame bar 131 or 132 by bolts 149. Preferably, the rod 147 is a sleeve rotatable on an inner tube 150 secured to the channel by suitable brackets 151. Vertically disposed guide bars 152 with inclined top edges are secured to the channels 148 adjacent to the rollers 145 to aid in centering the bottom receptacle in a stack when lowering it into place to be supported on the rollers 145.

FIGS. 15-17 illustrate how each of the roller supports 145 is tripped and the bottom receptacle removed when the shoes 136 are raised to support the lower rim flange 48a of the receptacle. Secured to the opposite end of each rod 147 is an irregularly shaped bracket plate 153 (see also FIG. 14), and a tripping roller 154 is secured to the underside thereof. As the shoes 136 are raised, the ends of each shoe engage under two of the rollers 154, and as viewed in FIGS. 15 and 16, they rotate each roller and the rod 147 secured thereto clockwise around tube 150 against the tension of spring 155, and also each supporting roller 145 secured to rod 147, to release the roller 145 from engagement under the rim flange 48b. As the roller 145 is released the shoe 136 comes into abutment with the lower rim flange 48a, as shown in FIG. 16, and momentarily supports the stack of receptacles.

As the shoes are then lowered, the spring rotates the roller 145 counterclockwise, as shown in FIG. 17, and when the stack has been lowered enough to engage the roller 145 under the upper rim flange 48b of the receptacle next to the bottom, further lowering of the shoes will separate the bottom receptacle from the stack and the remaining stack will be supported by the rollers 145 in the position of FIG. 15. The separated bottom receptacle is then lowered to fruit receiving position, the link 156 (FIG. 13) connecting the chute 47 to parallel bar 138 acting to move the chute out of the way during the raising and lowering operation.

THE EXTENSIBLE BASE CONVEYOR BED

Figure 11:
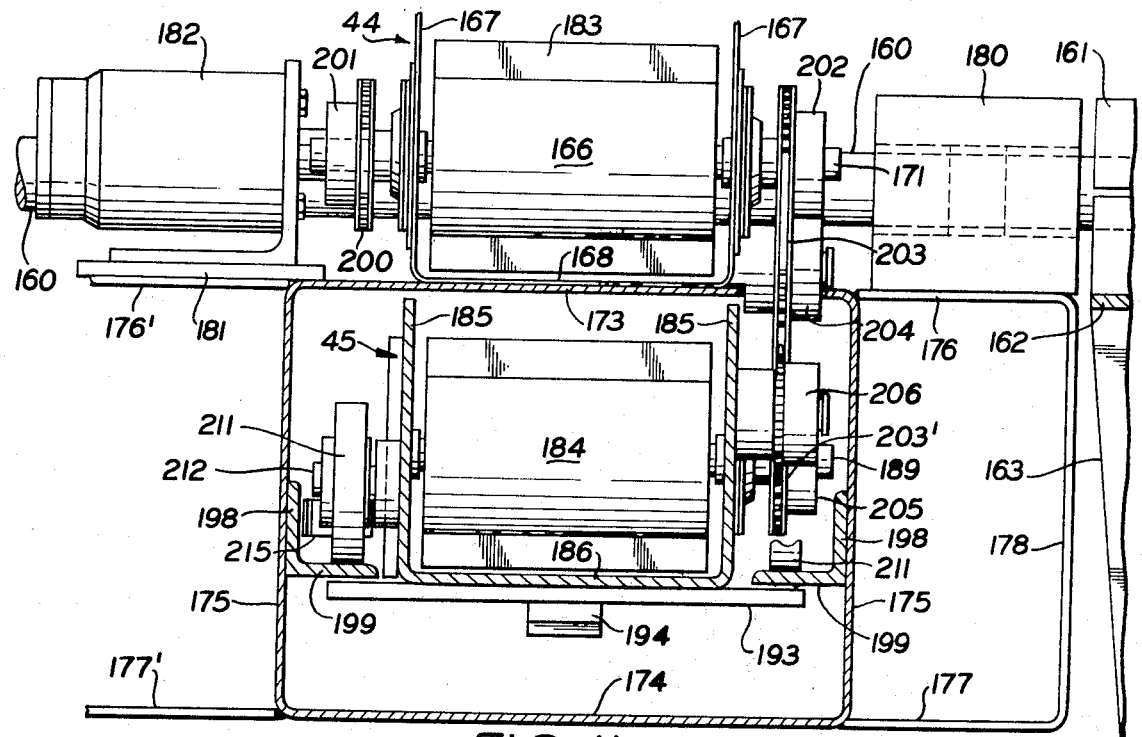
FIG. 11 is an enlarged cross-sectional view on line 11—11 of FIG. 5C of the horizontal extensible conveyor on the base vehicle at its receiving end.
Figure 12:
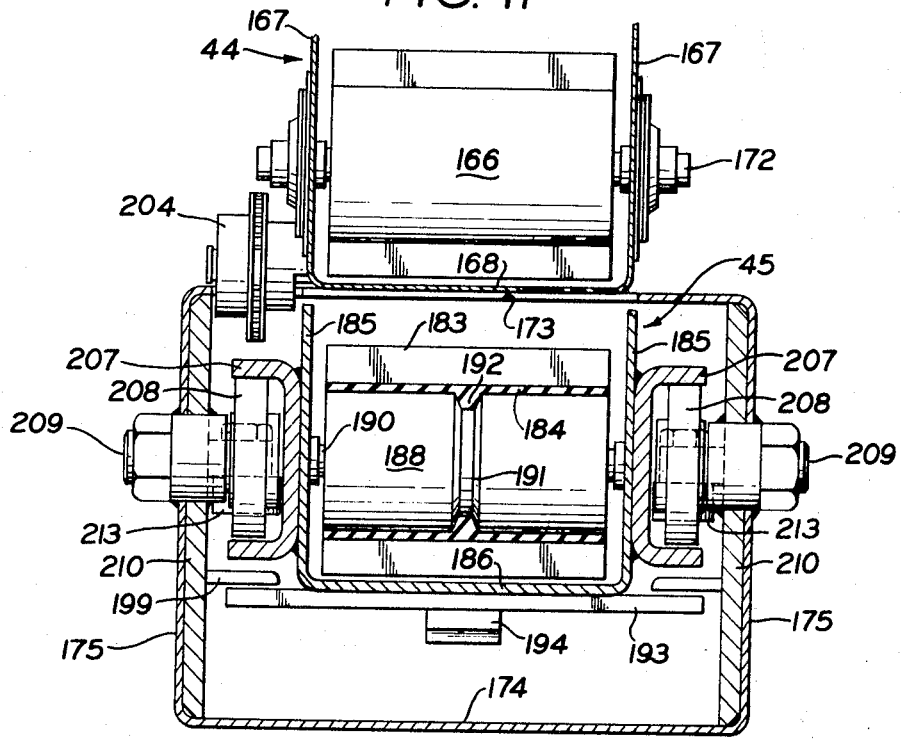
FIG. 12 is an enlarged cross-sectional view on line 12—12 of FIG. 5C of the horizontal extensible conveyor at is discharge end.

Referring to FIGS. 5C, 11 and 12, the conveyors 44 and 45 constitute the horizontal conveyor bed carried on the base vehicle 15, and this bed is pivotally mounted on housing 18 to compensate for variations in the ground surface between the vehicle 15 and the rear wheeled vehicle mechanism indicated generally at 46 previously described. The whole conveyor bed assembly is pivotally mounted on a transverse shaft 160 extending through the upper conveyor 44 and having its ends secured in support clamps 161 carried on plates 162 atop vertical support ribs 163 extending inwardly from the sidewalls 154 of the housing 18. As shown in FIG. 5C, the conveyor bed assembly projects rearwardly through an enlarged opening in the rear wall 165 of the housing giving clearance for the vertical pivotal movement of the bed assembly.

The upper conveyor 44 preferably comprises an endless belt 166 mounted within a channel having sidewalls 167 and a bottom wall 168, the belt being trained around a drive pulley 169 at its front end and an idler pulley 170 at its rear end, and the pulleys being mounted on shafts 171 and 172, respectively, journaled in sidewalls 167. The bottom wall 168 is supported on the top horizontal wall 173 of a rectangular housing for the lower conveyor, said housing having a bottom wall 174 and sidewalls 175.

Lateral housing extensions extend from the sidewalls 175 under the pivot shaft 160 and have top walls 176 and 176′ and bottom walls 177 and 177′ welded to and extending laterally from top and bottom walls 173 and 174, respectively, the walls 176 and 177 being connected at their outer ends by vertical walls 178. The top walls 176 of the housing extension support a bearing 180 in which the pivot shaft 160 is journaled, and the top wall 176′ supports a drive motor 182 on a bed plate 181 and also extends laterally beyond said motor to support another shaft bearing 180 (not shown).

The lower conveyor 45 preferably comprises an endless belt 184 mounted within a channel having sidewalls 185 and a bottom wall 186, the belt being trained around a drive pulley 187 at its front end and an idler pulley 188 at its rear end, the pulley 187 being mounted on a shaft 189 and the pulley 188 being mounted on a shaft 190, both pulleys journaled in sidewalls 185. As indicated in FIG. 12, all of the pulleys 169, 170, 187 and 188 have a central V-groove 191 in which a rib 192 on the belt rides to prevent lateral movement of the belt. The conveyor belts have spaced flights or vanes 183 thereon to facilitate conveying fruit deposited thereon. The upper conveyors 39 and 40 are similarly constructed.

The bottom wall 186 of the lower belt channel preferably has a longitudinally extending bottom plate 193 welded thereon which carries a longitudinal rock bar 194 meshing with a pinion gear 195 on a shaft 196 operatively mounted on the rearward portion of bottom wall 174 of the lower conveyor housing. An independent drive motor (not shown) is suitably mounted on one side of the lower conveyor housing and is operatively connected to shaft 196 for extending and retracting the lower conveyor 45 within the housing. This motor is controlled from the control panel 66B by the picker, and normally regulates the step-by-step advancement of the rear vehicle 46, each time a full receptacle 48 is deposited, as well as other movements which may be required. Preferably, angular guide plates 198 are mounted on the inner surfaces of housing sidewalls 175 and have inwardly extending flanges 199 overlapping the side edges of plate 193.

The means for driving the conveyor belts 166 and 184 in all positions of extension and retraction of the lower conveyor, as controlled by the rack 194 and pinion 195, comprises the drive motor 182 driving a sprocket chain 200 trained around a sprocket 201 on the shaft 171 of drive pulley 169 for driving belt 166. On the opposite end of shaft 171 is a sprocket 202 driving an endless chain 203 trained around an idler and takeup sprocket 204 mounted on the rear portion of the upper conveyor channel.

The lower run of chain 203 is trained downwardly in a traveling loop 203′ which passes around a sprocket 205 on the drive shaft 189 to drive the lower conveyor belt 184. The loop 203′ is formed by two idler sprockets 206 meshing with the lower run of chain 203 and mounted on the adjacent sidewall 185 of the channel for the lower conveyor belt. Thus, as the lower conveyor 45 is extended rearwardly of upper conveyor 44, by the pinion 195 and rack 194, the idler sprockets 206 walk along the lower run of chain 203 and carry the traveling loop 203′ with the sprocket 205, and the chain continues to drive the lower conveyor belt in all positions of extension and retraction, in a manner similar to that described for driving the upper boom arm 26 as it is extended and retracted.

The lower conveyor channel has outturned channels 107 welded to the outer surfaces of its sidewalls 185 and forming tracks for vertical rollers 208 journaled on shafts 209 mounted in interior reinforcing plates 210 on the inner surfaces of housing sidewalls 175 at the rear ends thereof. At the front ends of the lower conveyor channel and spaced from the front ends of channel tracks 207 are rollers 211 mounted on opposite ends of a shaft 212 extending through the sidewalls 185 of the lower conveyor channel, and the rollers are supported on the flanges 199 of angles 198. Thus, the lower conveyor 45 is supported on the rollers 208 and 211 as it is extended and retracted. As indicated in FIG. 12, horizontal rollers 213 may be mounted adjacent to the vertical rollers 208 for abutting the inner surfaces of the tracks in the same manner as the horizontal rollers 107 abut the tracks in the upper boom arms. Similar horizontal rollers 215 may also be mounted adjacent the forward rollers 211.

As shown in FIGS. 5C and 13, the forward end of the lower conveyor 45 is preferably mounted on the frame of rear vehicle 46 by means of a swivel connection plate 216 secured to bracket plates 186a depending from the rear end of the lower conveyor channel. The plate has a socket for receiving a ball 217 supported on a cross frame member 218 of vehicle 46, and a turn screw 219 is provided for locking the ball and socket against separation.

PICKING HEDGEROWS

Figure 21:
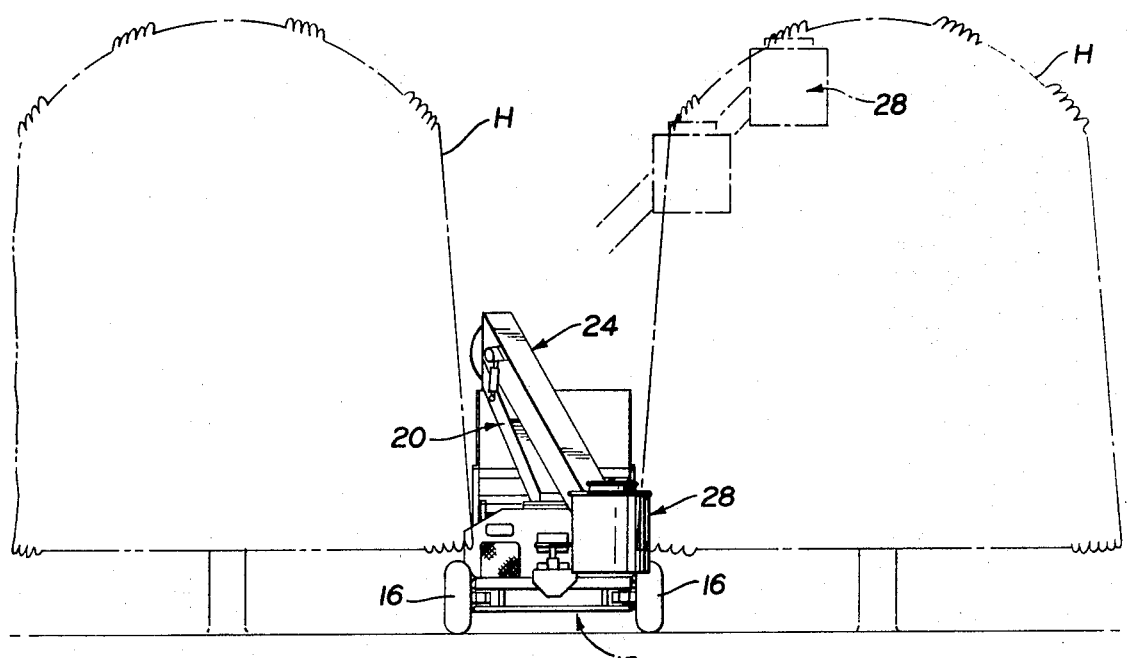
FIG. 21 is a schematic end view of the improved apparatus when used between two hedgerows.
Figure 20:
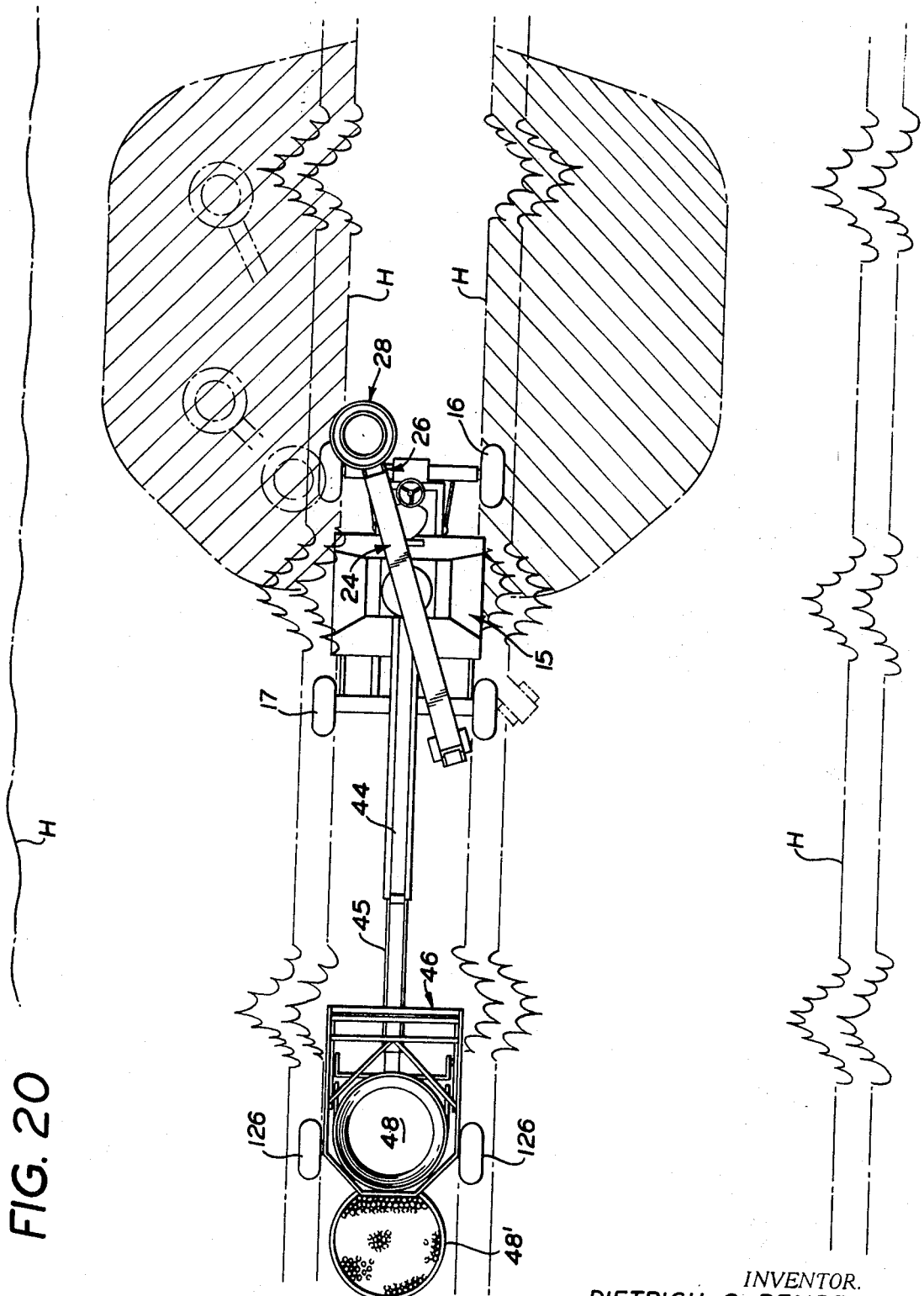
FIG. 20 is a schematic plan view similar to FIG. 19, showing how the improved apparatus can be positioned between hedgerows of fruit trees to pick fruit from opposed areas in the rows.

FIGS. 20 and 21 are schematic plan and end elevation views showing how the novel fruit-picking apparatus is well adapted for picking fruit from large trees which have been trimmed to form hedgerows indicated in chain lines at H in FIGS. 20 and 21. As shown, the space between the rows is wide enough to allow passage of the novel picking apparatus, with the wheels passing under the lowest branches. The phantom positions of the bucket 28 indicate the relative positions of the bucket, and the cross-hatched areas indicate the areas which can be reached by the picker from one position of the base vehicle.

SUMMARY

It will be seen that a novel and improved apparatus and method of picking fruit has been provided whereby the picker stands in a bucket enabling him to pick full circle with both hands from each and every position into which the bucket is moved, and the fruit is continuously conveyed through the articulated boom regardless of its inclination into the successively deposited collecting receptacles in a row for convenient pickup at the rear of the base vehicle. At least the inner spherical halves of two pairs of trees in two adjacent rows can be completely picked, top to bottom, from one position of the base vehicle, and all of the movements of the bucket to various positions and the operation of the mechanism for successively filling and depositing filled receptacles can be controlled by the picker from his perch in all positions. It is not necessary for the picker to leave the bucket at any time while continuously picking all of the fruit from the spherical halves of four trees, as well as successive groups of four trees. The branches and leaves of the trees are not damaged, and the fruit is carefully handled without bruising or other damage.

I claim:

1. Apparatus for picking fruit from rows of various sizes of trees including a base supporting vehicle having rearwardly extensible lower conveyor means thereon, a rear vehicle carrying the rear end of said conveyor means, means on said rear vehicle for supporting a receptacle in position to receive fruit discharged from said conveyor means and for depositing said container when filled upon the ground, a hollow upwardly inclined lower boom rotatably mounted on the base vehicle with its lower end over the front end of said lower conveyor means, means to rotate said lower boom, a hollow upper boom hinged upon the upper end of said lower boom, means for raising and lowering said upper boom, extensible upper conveyor means within said upper boom for conveying fruit through said boom into said lower boom in all positions of said upper boom, a picker-supporting bucket pivoted on the outer end of said upper conveyor means having means for receiving fruit from the picker and discharging it onto said upper conveyor means, and means for maintaining said bucket substantially upright in all positions of the upper boom.

2. Apparatus as defined in claim 1 in which the picker-supporting bucket is open around substantially its entire periphery, and the means receiving fruit from the picker comprises an outer annular chute for discharging the fruit onto said upper conveyor means.

3. Apparatus as defined in claim 1, having control means on said bucket for extending and retracting said upper and lower conveyor means, for rotating said lower boom and raising and lowering said upper boom, and for operating the receptacle supporting and depositing mechanism on said rear vehicle.

4. Apparatus as defined in claim 1, in which means are provided on said rear vehicle for supporting a stack of empty receptacles and for transferring one receptacle from said stack into position for receiving fruit from said lower conveyor means.

5. Apparatus as defined in claim 1, in which the inclined lower boom has fixed baffle means therein for retarding the gravity flow of fruit therethrough and movable baffle means for temporarily blocking said flow.

6. Apparatus as defined in claim 1, in which the extensible upper and lower conveyor means each comprise superposed upper and lower conveyor belts, with a single motor drive for each conveyor means, and traveling drive means operatively connecting said belts in all positions of extension and retraction.

7. Apparatus as defined in claim 1, in which the means for maintaining the bucket substantially upright is mounted on said bucket, and is controlled by a leveling switch on the bucket to automatically maintain the bucket in substantially upright position.

8. Apparatus as defined in claim 4, having control means on said bucket for extending and retracting said upper and lower conveyor means, for rotating said lower boom and raising and lowering said upper boom, and for operating said receptacle supporting, transferring and depositing mechanism on said rear vehicle.

9. Apparatus as defined in claim 2, in which the means for maintaining the bucket substantially upright is mounted on the bucket, and is controlled by a leveling switch on the bucket to automatically maintain the bucket in substantially upright position.

10. Apparatus as defined in claim 6, in which the upper and lower conveyor belts are each trained around a drive pulley at one end, and an endless drive element is provided having a traveling loop operatively connecting the drive pulleys in all positions of relative extension and retraction of the belts.

11. In a fruit-picking apparatus having a hollow boom mounted on a base vehicle for delivering fruit to the front end of the vehicle, a conveyor bed pivotally mounted at its front end on said vehicle, said bed comprising superposed upper and lower conveyors, the lower conveyor being rearwardly extensible, a rear vehicle supporting the rear end of the lower conveyor in all positions of extension and retraction, means on said conveyor bed for extending and retracting said lower conveyor together with said rear vehicle, and movable means on said rear vehicle for supporting a receptacle in position to receive fruit discharged from the rear end of said lower conveyor.

12. In a fruit-picking apparatus as defined in claim 11, in which the movable receptacle-supporting means is adapted to deposit a filled receptacle on the ground while holding it in horizontal position.

13. In a fruit-picking apparatus as defined in claim 12, in which releasable means are provided for supporting a stack of empty receptacles and the movable receptacle supporting means is adapted to actuate said releasable means to drop the bottom stacked receptacle onto the movable receptacle supporting means for being transferred to and held in fruit-receiving position.

14. In a fruit-picking apparatus as defined in claim 12, in which the movable means for supporting a receptacle in fruit-receiving position comprises two shoes for engaging under opposite sides of the receptacle rim, said shoes being pivotally mounted on parallel bars pivoted to said rear vehicle in pantographic arrangements for maintaining the receptacle horizontal in all adjusted positions.

15. In a fruit-picking apparatus as defined in claim 13, in which the movable means for supporting a receptacle in fruit-receiving position comprises two shoes for engaging under opposite sides of the receptacle rim, said shoes being pivotally mounted on parallel bars pivoted to said rear vehicle in pantographic arrangements for maintaining the receptacle horizontal in all adjusted positions.

* * * * *